United States Patent
Walker

(10) Patent No.: US 6,748,022 B1
(45) Date of Patent: Jun. 8, 2004

(54) SINGLE SIDEBAND SUPPRESSED CARRIER DIGITAL COMMUNICATIONS METHOD AND SYSTEM

(76) Inventor: Harold R. Walker, 78 Oliver Ave., Edison, NJ (US) 08820

( * ) Notice: Subject to any disclaimer, the term of this patent is extended or adjusted under 35 U.S.C. 154(b) by 550 days.

(21) Appl. No.: 09/612,520

(22) Filed: Jul. 5, 2000

Related U.S. Application Data

(60) Provisional application No. 60/142,629, filed on Jul. 6, 1999.

(51) Int. Cl.$^7$ .............................................. H04L 25/04
(52) U.S. Cl. ...................................................... 375/289
(58) Field of Search ................................ 375/289, 286, 375/350; 333/24 R; 327/311, 312, 552

(56) References Cited

U.S. PATENT DOCUMENTS

| | | | |
|---|---|---|---|
| 5,530,391 A | * | 6/1996 | Bohme et al. ............... 327/311 |
| 6,518,854 B2 | * | 2/2003 | Kayano et al. ............ 333/99 S |
| 6,535,077 B1 | * | 3/2003 | Hiroshima et al. ........... 333/26 |

* cited by examiner

*Primary Examiner*—Khai Tran
(74) *Attorney, Agent, or Firm*—Duane Morris LLP

(57) ABSTRACT

A method of modulating a phase reversing pulse train including a plurality of signal pulses each having an associated period of a given temporal duration to encode a multiplicity of input data bits each having a data state, and prevent losses of clock timing. The method includes the steps of: identifying select ones of the input data bits which repeat the data state of a respectively preceding one of the input data bits; identifying select ones of the pulses which correspond to the select bits; and, alternately shortening and lengthening the periods associated with the select ones of the pulses.

34 Claims, 18 Drawing Sheets

SINGLE SIDEBAND SUPPRESSED CARRIER DIGITAL COMMUNICATIONS METHOD AND SYSTEM

RELATED APPLICATION

This application claims the benefit of U.S. Provisional Application No. 60/142,629, entitled "DIGITAL COMMUNICATIONS SYSTEM", filed on Jul. 6, 1999, the entire disclosure of which is hereby incorporated by reference.

FIELD OF INVENTION

This invention relates generally to communications systems, and more particularly to single sideband digital communications systems.

BACKGROUND OF INVENTION

This invention has as a background, U.S. Pat. Nos. 4,742,532 and 5,185,765 covering VPSK, the entire disclosures of which are hereby incorporated by reference herein. U.S. Pat. No. 5,930,303, which covers VMSK and VMSK/2, is also background, the entire disclosure of which is also hereby incorporated by reference herein.

U.S. Pat. No. 5,930,303 discusses aperture encoding the entire disclosure of which is also hereby incorporated by reference herein as if being set forth in its entireties. Finally, a paper "Spectrally Efficient Biphase Modulation" by Dr. C. Koukourlis, Dr. J. Sahalos, Mr. John Pliatsikas and the Mr. Harold Walker, the inventor hereof, deals with a similar method involving a different encoding algorithm. This paper appeared in the May 1998 Issue of Applied Microwaves and Wireless magazine. An expanded version of this paper with more mathematical detail is published in "Third Generation Mobile Systems", edited by Dr. P. Stavroulakis, published by Springer Verlag, Berlin, in the fall of 1999.

The present invention relates to a new and novel single sideband digital communications system that does not require an RF carrier for reception, reduces the bandwidth required to far less than that required by most methods and has an excellent to superior Bit Energy to Noise ratio for a given bit error rate. The method is self clocking, can tolerate rapid changes in frequency, such as Doppler effects for example, and tends to cancel or ignore interference of various kinds so that the Signal-to-Noise Ratio (SNR) can approach Shannon's Limit for usable error rates.

It is the object of the present invention to encode the data into a single frequency while improving the SNR required for a given Bit Error Rate (BER) while simultaneously reducing undesired emissions so as to more easily meet applicable regulatory requirements.

SUMMARY OF INVENTION

A method of modulating a phase reversing pulse train including a plurality of signal pulses each having an associated period of a given temporal duration to encode a multiplicity of input data bits each having a data state, and prevent losses of clock timing, the method comprising the steps of identifying select ones of the input data bits which repeat the data state of a respectively preceding one of the input data bits; identifying select ones of the pulses which correspond to the select bits; and, alternately shortening and lengthening the periods associated with the select ones of the pulses.

BRIEF DESCRIPTION OF THE FIGURES

Various objects, features and advantages of the invention will become more apparent by reading the following detailed description in conjunction with the drawings, which are shown by way of example only, wherein:

FIG. 9b illustrates a crystal mode filter which offers improved group delay performance as compared with the filter of FIG. 9a;

DETAILED DESCRIPTION OF THE PRESENT INVENTION

Figure 1:
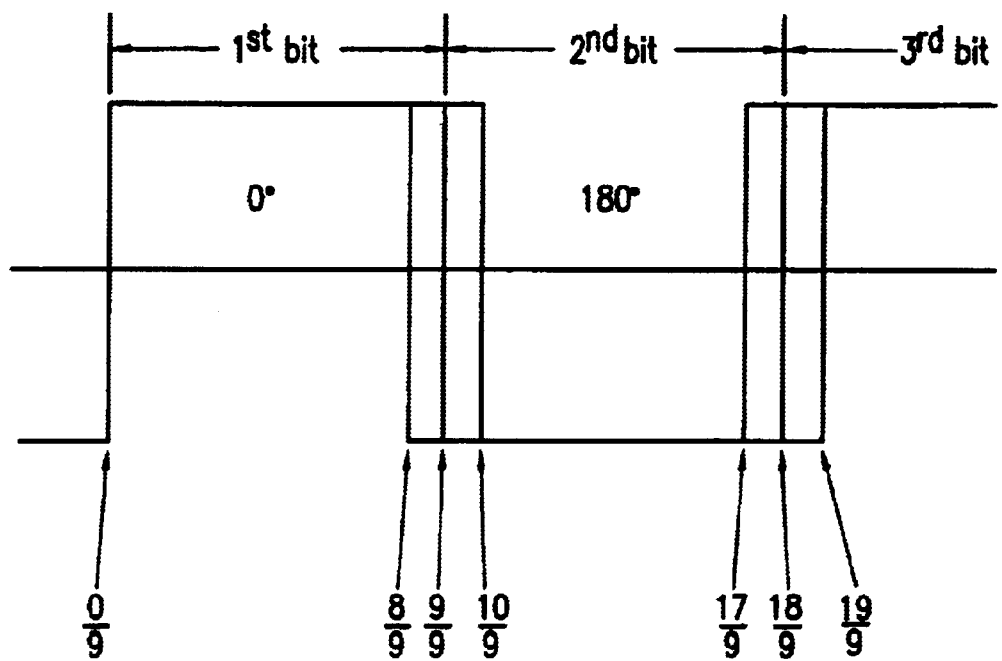
FIG. 1 illustrates a phase reversing bipolar 8/9/10 pattern signal encoded according to the present invention.

Generally, it is an object of the present invention to provide an encoding method that causes the modulated spectrum at baseband to be a single frequency, which alternates in phase with each coded bit period, the single frequency then being used to modulate an RF carrier, which is then suppressed so that only the sidebands remain. One sideband is removed so that only a single RF frequency of alternating phase is transmitted. It is a further object of the present invention to introduce a new class of filters which exhibit a group delay which is much less than that of the commonly known filters of the "Ideal" or "Nyquist" type which can be used to implement the method according to the present invention. The encoding method is made to ignore long strings of ones or zeros, which could cause the data stream to lose clocking.

It should be understood that basically, the present invention is one of a class of methods known generally as "biphase modulation methods", or "single sideband biphase methods". As a class they have several characteristics in common. They generate a baseband signal that has its spectrum confined to a very narrow bandwidth located at the baseband modulation frequency above 0 Hz. Ideally this spectrum consists of a single frequency spectral line at ½ the bit rate. The baseband signal is used to amplitude modulate a carrier with the carrier suppressed, then one or the other sideband is removed and only the desired upper or lower sideband is transmitted. This information bearing sideband is much narrower than the Nyquist bandwidth, so the full Nyquist sideband need not be transmitted at RF. This results in considerable bandwidth savings with a consequent reduction in noise bandwidth and an increased/improved SNR.

Encoding Method

A new and novel encoding method is used in the present invention to obtain the desired very narrow bandwidth information bearing sideband. It is well known to those skilled in the art that all of the modulation information is contained in the sidebands. As a result, only one of the sidebands need be transmitted. The carrier can be reinserted later in the receiver, if used. It should be recognized however that the present invention does not require the reinsertion of the carrier.

To create a sideband that appears to consist only of a single frequency spectral line, a base modulation frequency is used. In VPSK and in the present invention, this single frequency represents a changing bit pattern—1010101010 . . .—until a repeat bit is signaled. In VMSK/2, this base time period represents all ones or all zeros being repeated. To cause a change from the base time period, a bit time distortion is introduced. For example in VPSK, a change to a shorter bit modulation period represents a "hold the last bit". In VMSK/2, the modulation bit pattern is shortened by a fractional bit period for a one and stretched by a fraction of bit period for a zero. In both of these methods, the spectrum centers around the base frequency, which alternates in phase from 0 to 180 degrees each varying bit period.

It is well known to those skilled in the art that time and frequency are convertible, i.e. that bit time period $T_b=1/f$. It is also known that frequency deviation and phase deviation are convertible by the relationship $\Delta f=\Delta\phi/2\pi T_b$, where $T_b$ is the time period of the modulation bit, or bit period.

The present invention uses one-hundred percent amplitude modulation (AM) of a Radio Frequency (RF) carrier, with varying phase reversal times. It can be shown that this is not the same as Frequency Modulation (FM) or Phase Modulation (PM), to which the above equation applies, and that the base frequency does not change due to modulation, which seemingly contradicts the above equation.

Assuming that this equation does apply, the modulation, which takes place in the time domain, can be converted to modulation in the frequency or phase domain for analysis purposes only. However, it will be shown that when the modulation index is small, e.g., $\pi/5$ radians or less, there is no frequency deviation. The baseband frequency becomes set at the single modulation frequency, which is ½ the bit rate. All modulation is phase reversal on a single frequency.

A new and novel encoding method is used to vary the symbol period compared to the method disclosed in U.S. Pat. No. 5,930,303. The encoding algorithm is as follows. Referring now to FIG. 1, assume an 8,9,10 code is to be used, although it should be understood that any suitable number sequence can be used. Hence, incoming bits are divided into 9 fractional parts. The phase of the modulating information reverses after each bit period, but this bit period can be shortened or stretched by ⅑ bit period. Thus, the phase can reverse after 8/9, 9/9 or 10/9 bit period, or $\pi$ radians±1/9 radian. Thus $T_s=T_b\pm T_b/9$, or it can equal $T_b$ if the phase reverses after a 9/9 period.

A 9/9 period indicates the last bit, whether a one or zero, has just been changed. The base frequency in this example of the present invention is represented by a phase reversing 9/9 period. This represents a 1010101010—or +−+−+−+− pattern. This frequency is the data modulation frequency, which is ½ the bit rate. If the present bit is a one and it is desired to repeat the one, the next time change will be an 8/9 period. If the present bit is a zero and it is desired to repeat the zero, the next change will be 10/9. If it is desired to repeat a string of ones, the sequence will be 9/9 to get to the first one, followed by 8/9, 10/9, 8/9, 10/9, . . . until a 9/9 is inserted to cause a change to a zero. If it is desired to repeat a string of zeros, the sequence will be 9/9 to get to the first zero, followed by 10/9, 8/9, 10/9, 8/9, . . . until a 9/9 is inserted to indicate a change to a one. These time difference sequences offer advantages, such as confirmation of the last change, and the opportunity to correct the data if the period sequence is not correct. More importantly, statistically there are more repeat bits in a random data pattern than there are changes. Also, the 8/9 periods are used to set the clock in the present invention, while the 9/9 and 10/9 periods are ignored. Only if there is a long string 1010101 pattern will the single frequency representing no time changes be present. This is an AA or 55 Hexadecimal (HEX) pattern repeated, which usually does not occur.

It is well known to those skilled in the art that a long digital string of zeros or ones (marks and spaces) can cause trouble in self clocking systems. The present invention deliberately converts strings of ones and zeros into changes to prevent a loss of clock timing during mark/space periods.

It has been observed that when a repeating sequence 9/9's or 8/9, 10/9, 8/9 is present there is no "grass". "Grass" as used here is derived from the Radar term for noise. It is the result of a random low frequency Fourier series due to the data pattern. The grass is an unfortunate product of the modulation method that results from the various changing time periods. It is not a necessary part of the signal and often must be filtered off to meet FCC regulations. Any reduction in the grass, however small, represents an improvement. The present code tends to reduce the grass or inter-symbol interference level in RMS power terms, making filtering easier.

The Spectrum Resulting From the Encoding

If the phase reversing 9/9 pattern discussed in relation to FIG. 1 is passed through a balanced modulator, the spectrum will consist of three spectral lines: a lower sideband, a carrier and an upper sideband. Usually the carrier is suppressed. There are no other modulation products present than these three. If the phase reversals occur at 8/9 and 10/9 alternating periods, the spectrum is expected to be the same except that now the single frequency sideband islands are expected to have a frequency shift from the base frequency. This shift cannot be seen as a frequency change on the spectrum analyzer if the difference is small. Assuming the bit period represents $\pi$ radians at the base frequency, which is varied in radian terms by $\pm 1/9$ radian, the baseband spectrum still appears to be a single line, but there is some low noise or "grass" which appears below the desired signal.

Figure 2:
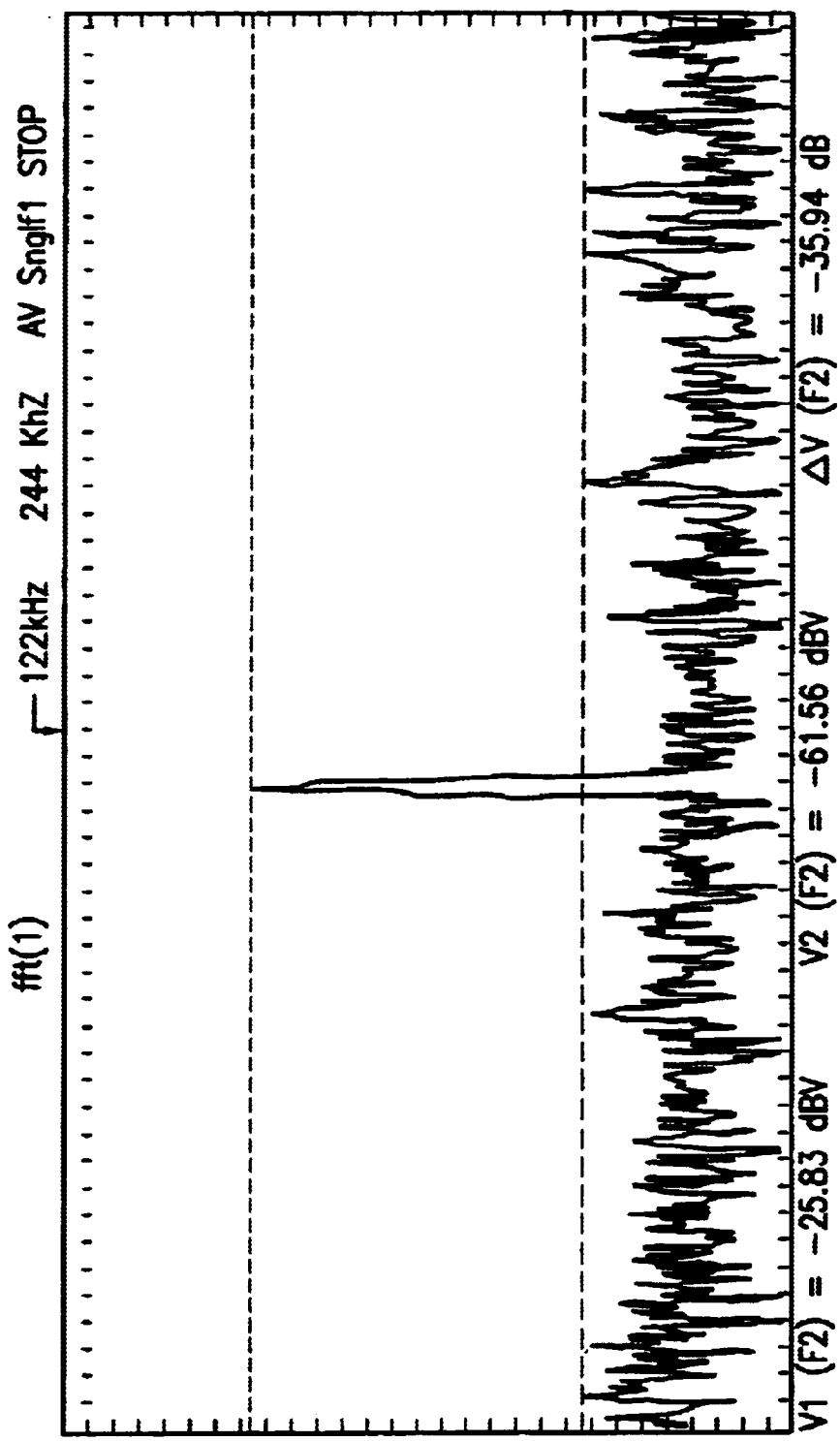
FIG. 2 illustrates an exemplary broadband spectrum resulting from the encoding of FIG. 1.

The expected frequency shift does not occur. An exemplary baseband spectrum as seen on a spectrum analyzer is shown in FIG. 2.

It has been discovered that when using the present encoding method, or any minimum shift keying encoding method such as VMSK, and bipolar AM modulation with a balanced modulator, that if the deviation index is $0.2\pi$ radians or less, the sidebands have no frequency deviation. The signal is actually $[f_c+f_m\pm\Delta f_m]$ when the modulation index is greater than 0.25, but becomes $[f_c+f_m\pm\Delta\phi]$ when the modulation index is less than 0.25. This can be represented in phase angle terms as $[(\omega_c t+\omega_m(t+-\Delta t)]$. There is no change in $(f_c+f_m)$ when the modulation index is less than 0.25. Hence, FIG. 2 shows a single frequency line. The phase modulation is not visible on the spectrum analyzer. This single frequency line can be proven mathematically as will be noted later. It should also be noted that $f_c$ and $f_m$ are fixed values. Referring still to FIG. 2, the vertical scale is 10 dB per division, and the apparent bandwidth of the central spike carrying the modulation is very small, theoretically approximately 1 Hz.

The Fourier transform of a signal encoded as in FIG. 1 at baseband is: $V(f)=\cos\theta$, where $\theta$ equals $(\pm\pi/2\pm\Delta\phi)$ radians. This becomes $V(f)=\sin(\omega_m t\pm\Delta\phi)$ by changing the mathematical analysis starting point. This indicates the bit period lasts $\pi$ radians and it varies by a small amount in time due to the encoding before reversing in phase. With the 8,9,10 code shown in FIG. 1, the variation $\Delta\phi$ is $\pm\pi/9$ radians.

Since the encoding method fixes $[f_c+f_m]$ to a single frequency $f_{sb}$, it can be seen that $(\omega_{sb}t+-\Delta\phi)$ results and $\Delta\phi$ is varying $(\pm\pi/2\pm\Delta\phi)$ as allowed by the slew rate, i.e. group delay, of the transmission path. The level of the "grass", or low level inter-symbol interference seen in FIG. 2, has been found to be slightly less than that of the $J_1$ Bessel product for a similar modulation angle using FM or PM with a modulation index based on $\Delta\phi$, but which would then have no fixed frequency. The equivalent modulation index is $-\Delta f_m/f_m$, or $\pm\Delta\phi$ radians.

A direct frequency comparison is not possible, since there is no frequency deviation in the present method. It might be supposed that the present modulation method is a form of Phase Modulation (PM) since $\pm\Delta\phi$ appears in the analysis, however this is not the case. This modulation method is a time varying Amplitude Modulation (AM) method in which there are no Bessel products. Only Fourier products are present, which can be removed by filtering.

While the frequency does not change, for analysis purposes only, a frequency change can be assumed. This enables the calculation of a term Q, which is a theoretical bandwidth efficiency in bits/sec./Hz. The actual bandwidth efficiency is much higher, being determined by the filter bandwidth obtainable. $Q=f_m/\Delta f_m=1/\text{Mod. Index}=2\pi/\Delta\phi$.

Seen from the viewpoint of a Fourier series that accompanies AM, there can be a near DC or low frequency offset associated with the varying time spent above or below the center line as seen in FIG. 1. This can add to the grass. If the time spent above or below the zero crossing or centerline is the same or reduced to a minimum, the grass is reduced. In VPSK modulation and VMSK modulation, there are data patterns where the positive and negative period differences are held for short periods of time, thus adding to the grass. In the present method, any shift in level is immediately followed by a shift in the opposite direction, thus tending to cancel or reduce any low frequency or amplitude offset. The RMS power in the grass is reduced compared to that of the original VMSK encoding method.

In VPSK modulation, covered by the cited issued patents, there is considerable level drift, with a noticeable low frequency Fourier product rise, since the base frequency is not centered at ½ the bit rate. This results in a noticeable spreading of the spectrum so that the calculated bandwidth Q is visible at the −26 dB points. In VMSK, there is a noticeable frequency spur at ¼ bit rate. This disappears when baseband VMSK is divided by 2 (VMSK/2), yielding a single spectral line as indicated here at $[\omega_c t+\omega_m(t+-\Delta t]$. An object of the present invention is to reduce sub-harmonic Fourier products by utilizing the code to control or reduce the level drift.

It may appear that this narrow spectral line, i.e. a single frequency, cannot possibly carry any modulation information, however this is not the case. The full modulation information is carried in the two sidebands and ½ of the modulation information is carried in one sideband. It should be recognized that it is well known to those skilled in the art that a single sideband is all that is required to transmit the data.

Figure 3:
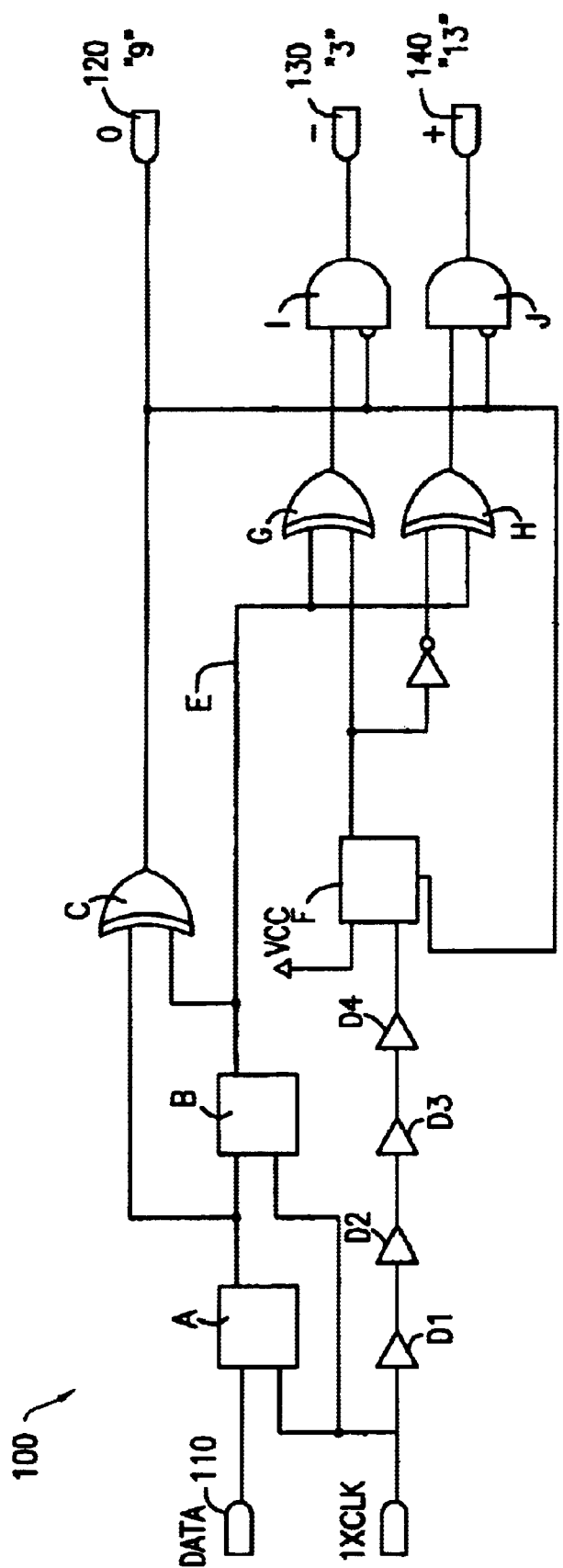
FIG. 3 illustrates a driver circuit according to the present invention.
Figure 4:
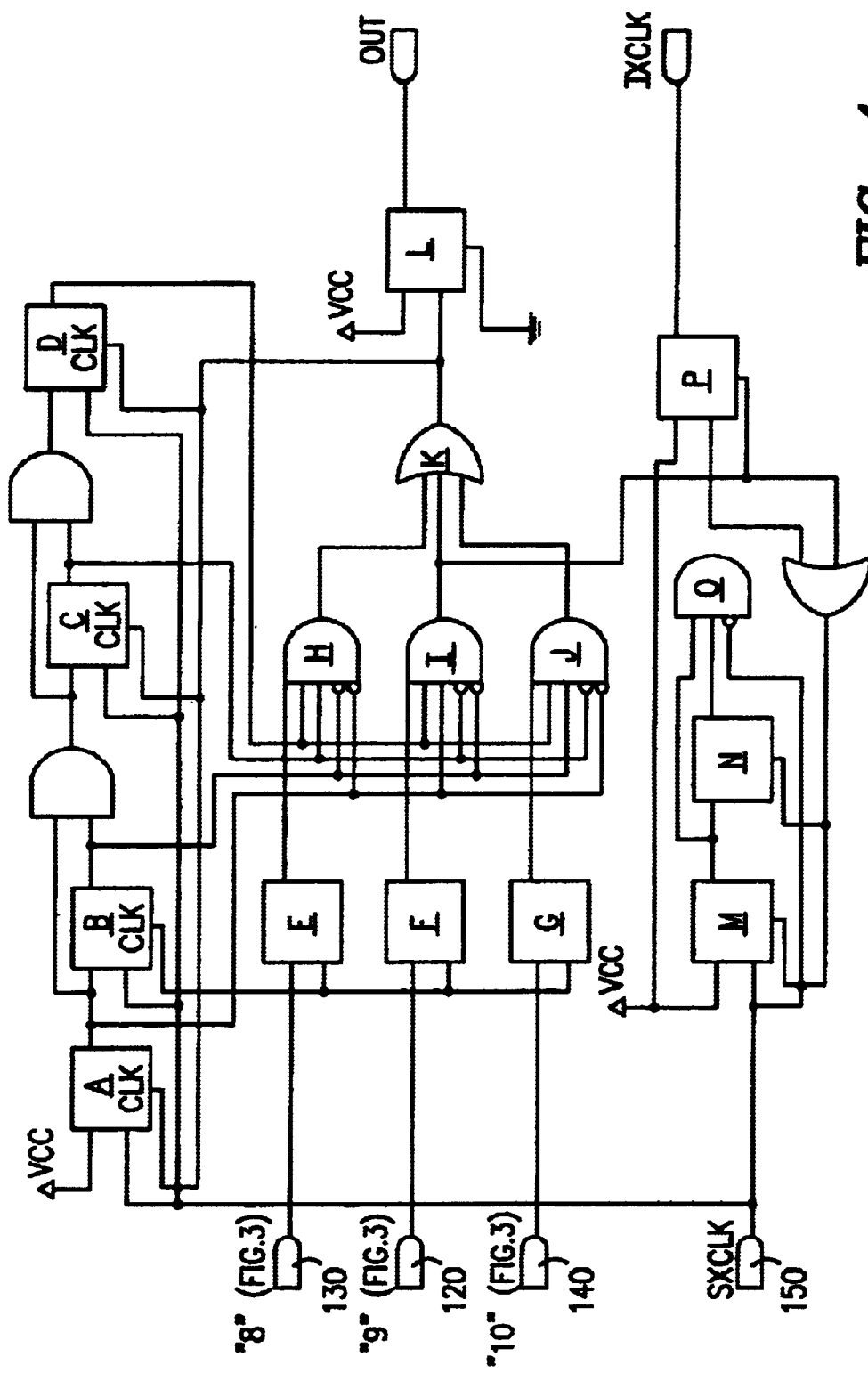
FIG. 4 an encoder suitable for use with the driver circuit of FIG. 3 to generate the 8/9/10 encoding of FIG. 1.

The single line spectrum which carries the data can be generated in the time domain by means of an encoding chip pair as shown in FIGS. 3 and 4. When this encoded output is passed through a balanced modulator of the type well know in single sideband AM practice, then filtered to remove the opposite sideband, an RF spectrum appearing to be a single line results, which is similar to that shown in FIG. 2. Following standard AM single sideband practice, the original baseband signal with varying time periods can be recovered by using a product detector with a reinserted carrier. This has been the standard practice for VPSK. Carrier reinsertion is not used with the present invention.

When transmitted single sideband AM with suppressed carrier, the upper sideband spectrum consists of the following components $[\omega_c t+\omega_m(t+\Delta t)]$. It can be detected by inserting $(-f_c)$ as in the case of Single Side Band (SSB) AM, or by inserting $(f_c+f_m)$, which can be obtained from the sideband alone leaving only $\pm\Delta\phi$.

The Encoder Circuitry

FIG. 3 shows a practical embodiment of the present encoding means for the present invention for an 8, 9, 10 code. This circuit 100 creates three output positions which can be followed by circuitry to create modulation in the time, frequency or phase domain. FIG. 4 shows the circuitry added for modulation in the time domain.

In FIG. 3, a shift register consisting of D type flip flops A, B accepts incoming data 110 and is responsive to a clock signal 1XCLK. The present bit is compared with the last bit in the XOR gate C. If the present and last bits are different, the output of the XOR gate C is high, passing a set 9 count to the 9 output 120, indicating the bits are changing.

If the data is not changing, a flip flop F is used to alternate the 8 (−) 130 and 10 (+) 140 outputs. If the data at the input shift register is different, the output of XOR gate C clears the flip flop F, setting the Q output low. When the data is the same, the clear input is turned off, the output of C is inverted via line E turning AND gates I and J on allowing a signal from the XOR gates G and H to pass. The XOR gates G and H can pass the signal appearing at one input gate as the same polarity or as an inverted polarity depending on the level of the other gate. The OR gate H has the input from the flip flop F inverted prior to being supplied thereto. Thus the ±Q signal from flip flop B determines whether or not the signal from the flip flop F will pass inverted or non-inverted to the gates I and J. The line E is passed to the inverting inputs of gates I and J which allows the signals from XOR gates G and H to pass when the output of XOR gate C is low.

The inverter sections D in series D1, D2, D3, D4 receive the 1XCLK signal and provide a time delay to the flip flop F to enable it to toggle or change state when the data externally is stable. Assuming the XOR gate C output is low, then the flip flop F will toggle with each clock period, causing alternating 8–9 outputs. The polarity of the outputs of the gates I and J is determined by the state of Q from flip flop B. As long as the output of gate C is low, the I and J outputs will alternate, indicating a "hold the last bit". Whether the bit being held is a one or zero depends on the state of the Q output of flip flop B. When a change of input occurs and the output of gate C goes high, gate F ceases to toggle and the output from gate C indicates a change. Changes are signaled as long as the gate C output is high. When the gate C output goes low, the last change is held and the toggling outputs from gates I and J cause outputs 8(−) 130 and 10(+) 140 alternations for the modulating circuitry to follow. (+)(0) and (−) notations are shown here because the encoder can also be used for ± phase shifts if applied to an FM or PM modulator.

FIG. 4 shows a circuit to create varying time periods, e.g. 8,9,10, in the present example as shown in FIG. 1. As set forth though, any number sequence can be used. An even number in the center, such as 7,8,9 is preferred because it can simplify the counters though. D type flip flops A, B, C, D are arranged to form a divide by 16 counter that can be reset to any count by the AND gates H, I and J. The D flip flops E, F and G are latches that hold incoming signals outputted from the circuit 100 of FIG. 3. For example the latch E sets an eight count via gate H. When the outputs of the counter stages reaches 8, but the 1, 2, 4 counts are zero, then there is an output from the gate H that is passed via the three input OR gate K to the flip flop L and to the clear inputs CLR on flip flops A, B, C and D. This output also returns to clear the latches E, F and G which are then set for a new count depending on the (8),(9) and (10) inputs 130, 120, 140. The flip flop L alternates in polarity with time periods according to the preset counts.

A 9X clock has been assumed as a clock input 150. A divider including flip flops M and N and gate O divides the 9X clock by 4.5. This is applied to the flip flop P which divides by 2 to obtain a total divide of 9 for the 1X clock. This is cleared by the 9 count from gate I to synchronize the 1X clock to the encoded data center.

Fourier Analysis—Spectrum of the Modulation Method.

The Fourier analysis of a waveform can start at any point in the waveform, but it is more convenient to start at the first voltage rise, or at the center of the first half. When started arbitrarily, the transform has both sine and cosine terms. When started at the center it is an even function and there are only cosine terms. When started at the first rise, it is an odd function and there are only sine terms. This implies that the transform can be either a sine or cosine series by merely changing the phase, or the start time of the analysis.

The Fourier transform converts time/level changes, v(t), to frequency and phase changes −V(f). $v(t) = \mathcal{F}^{-1} V(f)$.

Figure 5:
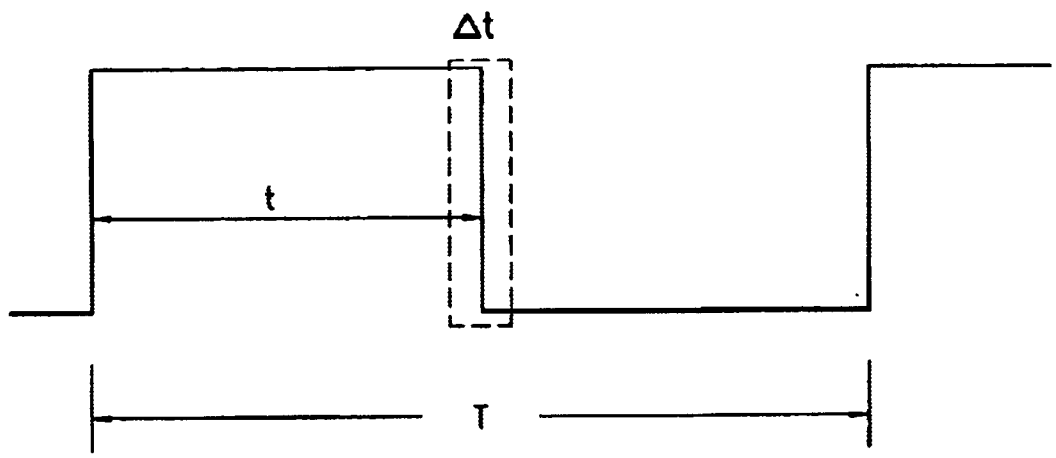
FIG. 5 illustrates the relationship between 8/9/10 encoding time and bit period.

The Fourier series representing the present encoding waveform of FIG. 1 is:

$v(t) = \mathcal{F}^{-1}\{2A_{av}[½+(2/\pi)\cos \theta − (²/₃\pi)\cos 3\theta + ± \ldots ]\}$ or:

$v(t) = \mathcal{F}^{-1}\{2A_{av}[½+(2/\pi)\sin \theta − (²/₃\pi)\sin 3\theta + ± \ldots ]\}$ $\theta = 2\pi(t/T) = 2\pi(1/T)t = 2\pi f t = \omega t$, and $A_{av} = A(t/T)$ Referring now to FIG. 5, it shows the relationship between time periods, where t is the 1st half of the encoded waveform and T is the complete cycle, representing 2 bit periods. The bit periods are fixed, while t varies by an amount ±Δt and becomes t±Δt. v(t) in this case includes all of the harmonics which are odd numbered. The series is that of a repeated number of sinx/x pulses. T and f are fixed in time and value ($f_m = 1/T$). The ½ term is added to center the waveform about a DC average $A_{av}$. Due to filtering, all but the fundamental $V(f) = 2A_{av}[½+(2/\pi)\cos \theta]$ is removed.

Due to the balanced waveform and AC coupling, all DC components and relative levels can be removed. Only V(f)= Cos θ or V(f)=Sin θ remains. There is no reference level to compare with, so multipliers in front of V(f) are not needed. $f_m = 1/T$, so $\theta = 2\pi(t/T) = 2\pi(1/T)t = 2\pi f_m t = \omega_m t$. The duration of 1 cycle for VMSK/2 is T=2 bit periods. The change in $A_{av}$ using a repeat byte in the 8, 9, 10 case is (1/18)AV (8/18, 9/18 and 10/18). It should be recognized though that 9/18 is not actually a change, but a hold in place. The principle change other than the Cos θ components is in $A_{av}$, which has an AC component changing with the data pattern. The level of A is the peak voltage, e.g. in CMOS circuits approximately 4.5 V. If the coding is centered about the mid voltage point (AC coupled), it varies with 8/18, 9/18 and 10/18 in level, a variation of ±1/18. This is a voltage relationship so that this $\Delta A_{av}$ component represents −26 dB in output level (peak). This can be observed when transmitting a single character. The level of $\Delta A_{av}$ with random data is lower due to the shaped pulse plus the fact that it is a sub-harmonic of the bit rate, with the addition of its own harmonics and ringing periods as a result of the sinx/x waveform. In fact $\Delta A_{av}$ is a second Fourier series superimposed on the first, lower in amplitude and at different frequencies than the original. It is an amplitude product much lower in level with no relationship to the phase of the desired signal, hence it can be removed by filtering. This is the grass, or low level noise seen in FIG. 2.

The small change in phase must be added:

$V(f) = \sin[2\pi f_m(\tau \pm \tau/18)] = \sin[2\pi f_m \tau \pm 2\pi f_m \tau/18)] = \sin[(\omega_m \tau \pm \omega_m \tau/18)]$ Filtering Filtering is required in the RF transmitter, i.e. for time domain modulation, to remove the carrier remnants and the opposite sideband. It is also used to reduce the out of band noise, i.e. grass. In the receiver, filtering is required to reduce the noise bandwidth and reduce interference from adjacent channels. Conventional filtering is responsive to the formula $\omega t = \Delta \phi$. This formula leads to a maximum group delay for the filter that cannot exceed the bit period. As the bandwidth of a filter narrows, the group delay increases. $T_g = \Delta \phi / 2\pi \Delta f$. Using the present encoding method, which narrows the value of Δf to less that $1/T_b$, it is noted that conventional filtering will not pass the signal of the present invention without loss of level as $T_g$ increases, which can result in the complete loss of all modulation.

Figure 6:
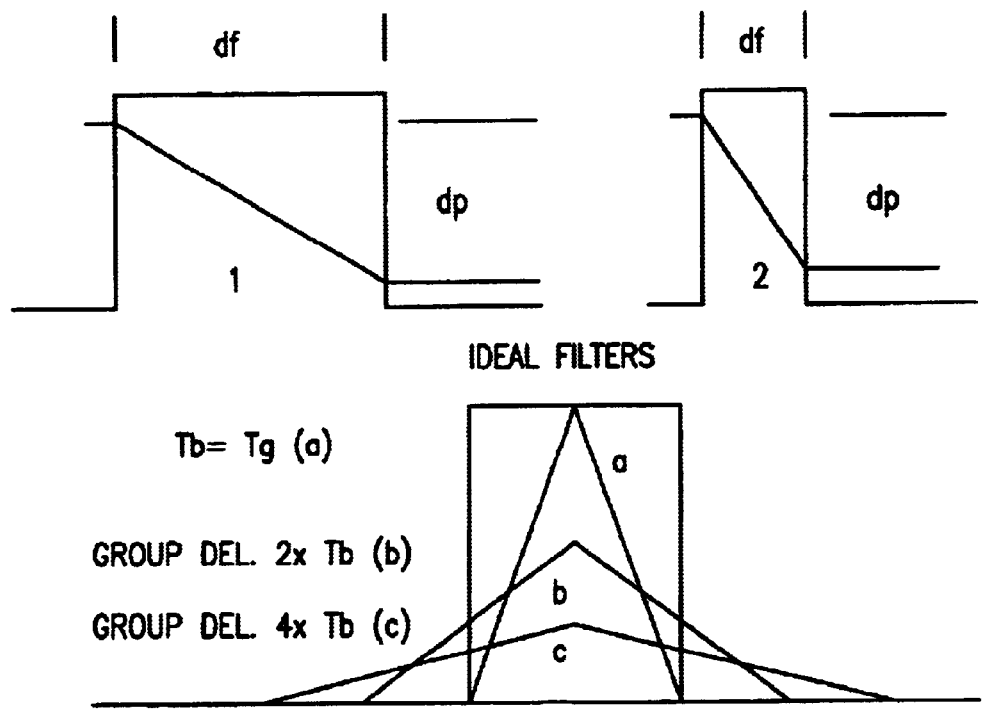
FIGS. 6 and 7 illustrate losses experienced with an increasing group delay due to filtering.

A new concept in filtering is required. As a practical example, a 2 pole crystal filter 10 Khz wide has a group delay of 60 microseconds. The present encoding method utilizing a data rate of 250 Kb/s has a bit period of 4 microseconds. The modulation will be lost in the filter. All attempts to create computer simulations of the biphase encoding methods (VPSK, VMSK, VMSK/2) have failed because there is no applicable Narrow Band conventional filter that has a group delay less than the bit period $T_b$. Only conventional filters with a Nyquist bandwidth and corresponding large group delay are available as shown in FIG. 6. The group delay of a conventional filter can be obtained from: $T_g = [\Delta \theta / 2\pi \Delta f]$. When the filter bandwidth is narrowed, the group delay rises. The effects of this narrowing can be seen as operating characteristics (a), (b) and (c) in FIG. 6, where operating characteristic (a) is indicative of $t_b=t_g$; characteristic (b) is indicative of a group delay of twice $t_b$; and, characteristic (c) is indicative of four times $t_b$. If the filter bandwidth matches the bandwidth of the sinx/x pulse, or is greater than that of the sinx/x pulse, the maximum energy will pass. In the group delay equation, dp is fixed at π radians, hence df and the group delay are directly related. Saying that the bandwidth is too narrow is the same as saying that the group delay is too large for the bit period $T_b$. As group delay increases the filter output decreases. This is true of pulses where an amplitude output is expected and of phase modulation, where a phase shift is expected. The phase deviation simply decreases with the increasing group delay. This can be equated with a "slew rate". The phase simply cannot slew fast enough if the group delay is too large. The present invention is dependent upon ±90 degree phase shifts. Any loss in this amount of shift results in lowered detector output.

Figure 7:
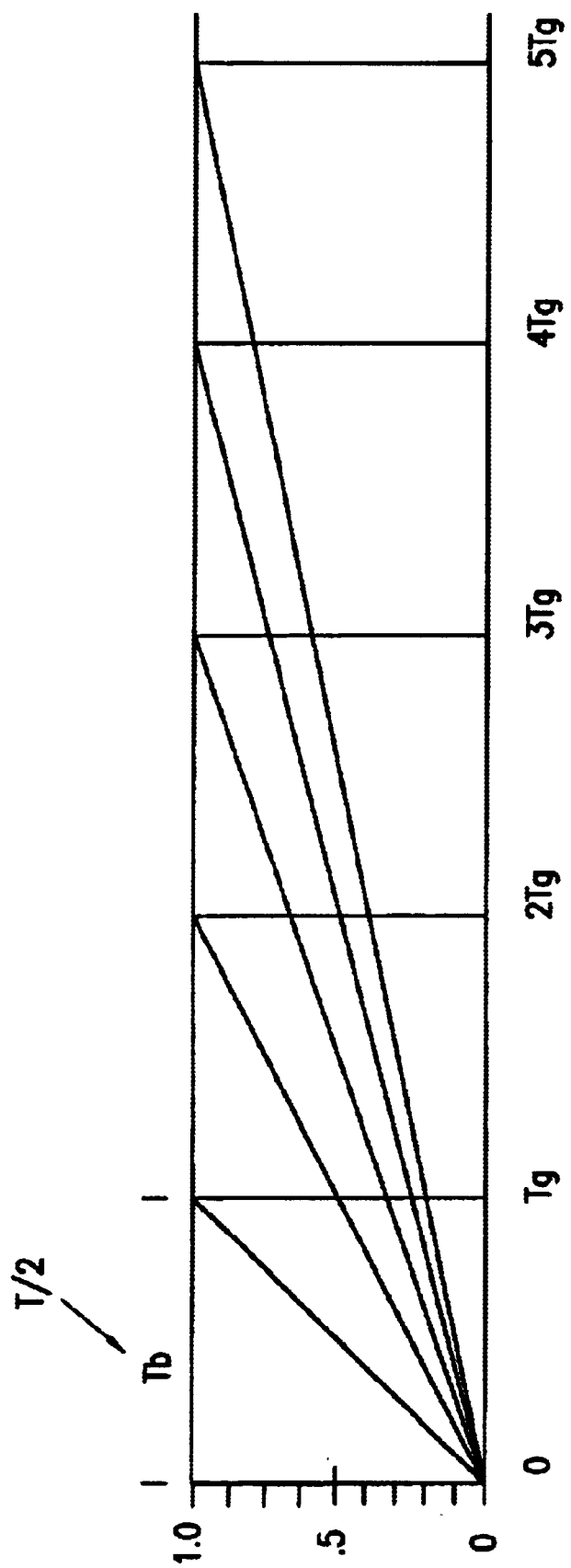

Referring now also to FIG. 7, it shows the bit period versus the relative phase output levels with group delay exceeding the bit period. If the group delay is 5 times the bit period, the phase shift output is reduced to 20% of peak. The filter group delay is additive. If the transmitter filter group delay is equal to the bit period and the receiver filter group delay also equal to the bit period, the total group delay is 2 bit periods, and only 50% of the phase shift in the modulation will pass.

In order to narrow the bandwidth sufficiently to obtain the advantages of the present encoding method, the filters must be narrower, which in turn increases the group delay. In an ideal filter:

$T_g=[\pi/2\pi\Delta f]$, where $\Delta f=f_b=2f_m$, and $T_g=\frac{1}{4} f_m$. For VMSK/2 and the present method, where Q=2 times the center number of the code (16 for a 7,8,9 code): $T_g=Q/4 f_m$. This implies that a filter matching the characteristics of the ideal filter for VMSK/2 has Q times too much group delay to slew the phase 180 degrees or π radians in one bit period.

Ordinary filters, be they real or simulated, cannot be used, since they have too much group delay. Filters with group delay periods exceeding the bit period can remove all of the modulation, passing only $f_m$ as a single unmodulated frequency. When the full Nyquist bandwidth is used, there is no difficulty with the group delay of a normal filter. VMSK/2 and the present method however, use only a small portion of the Nyquist bandwidth so the group delay rises as the filter bandwidth narrows and the modulation can be lost. Narrowing the bandwidth is necessary to reduce the noise bandwidth.

Figure 8:
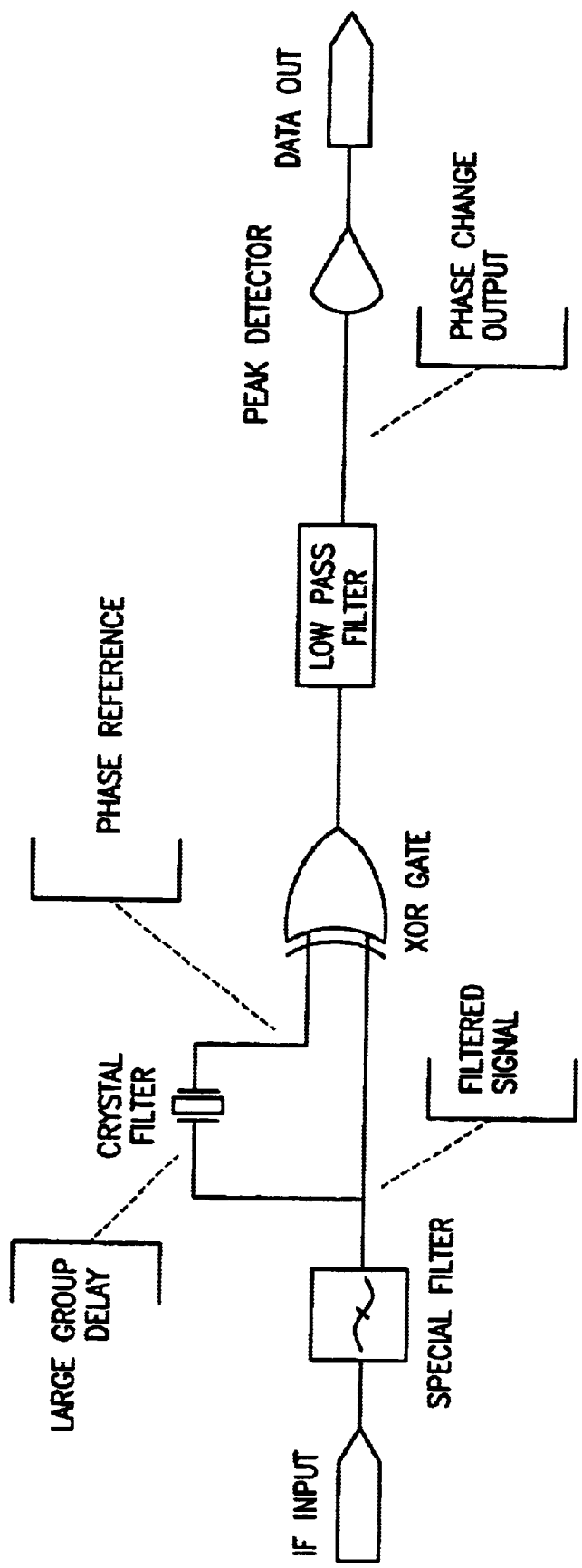
FIG. 8 illustrates a series crystal filter which features a large group delay to identify a phase reference.
Figure 12:
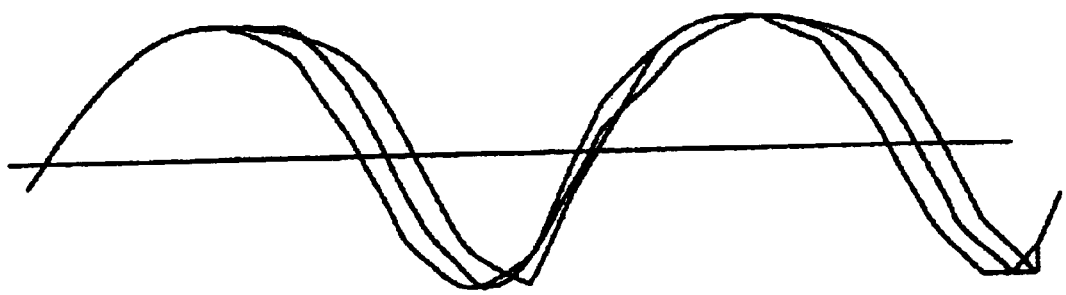
FIG. 12 illustrates an exemplary output attainable using the detector of FIG. 11, using the sideband itself as a reference.

This group delay characteristic is useful in obtaining a reference without modulation, which can be added to the modulated signal for detection in a phase detector. The series crystal filter shown in FIG. 8 has a group delay many times the bit period of the data, hence it robs the data stream of its modulation, e.g. phase, frequency or amplitude. This results in a constant frequency at the single sideband frequency only, which can be used as a reference. Passing the original signal to one input of an XOR gate used as a phase detector to be compared with this reference yields a baseband output corresponding to the phase changes. FIG. 12 show the output of such a detector, using the sideband itself as a reference.

The Ideal filter and the Nyquist filter have one thing in common, they comply with the accepted formula for Group Delay, i.e. $T_g=\Delta\theta/2\pi\Delta f$. The narrowest bandwidth possible is equal to the symbol rate. The best group delay possible is equal to $1/f_b$ and the phase change edge to edge is ±90 degrees. Thus there is a problem as far as Single Sideband Suppressed Carrier Modulation methods such as VMSK and the present method are concerned. Special low group delay filters are required to accommodate the narrow bandwidths of these modulation methods or all advantages are lost.

There is no known way at this time to solve this problem at baseband. There is no known filter at baseband that can meet the low group delay requirements of the present method. A filter having a Nyquist bandwidth must be used, which may seem logical since the definition of the Nyquist filter defines the bandwidth for a given sampling rate. This filter would be too broad to be used effectively as the noise bandwidth is excessive.

At RF however there is a solution. Non-Nyquist filtering to pass a very narrow bandwidth with minimum group delay is a part of this invention. The "non-Nyquist filter" is a special filter that bypasses the filtering element and complies with two rules: 1) If the signal is passed through the filtering element, it is subject to the group delay of the filtering element. 2) If the filtering element, which is excited by the narrow band rapidly phase reversing signal frequency, but subject to a large group delay, is used as a reference only, then the group delay can be defeated.

To meet this condition, a rapidly reversing phase single frequency sideband used alone is necessary. Therefore these filters must be used in combination with a modulation method such as that of the present invention, or they become conventional filters with a large group delay. If the filter used in combination with the present modulation method is used for FM or PM, it becomes a conventional filter with large group delay. This indicates the present invention is not a form of FM or PM. Other modulation methods must pass both sidebands, or a broad single sideband with restored carrier to function.

Figure 9B:
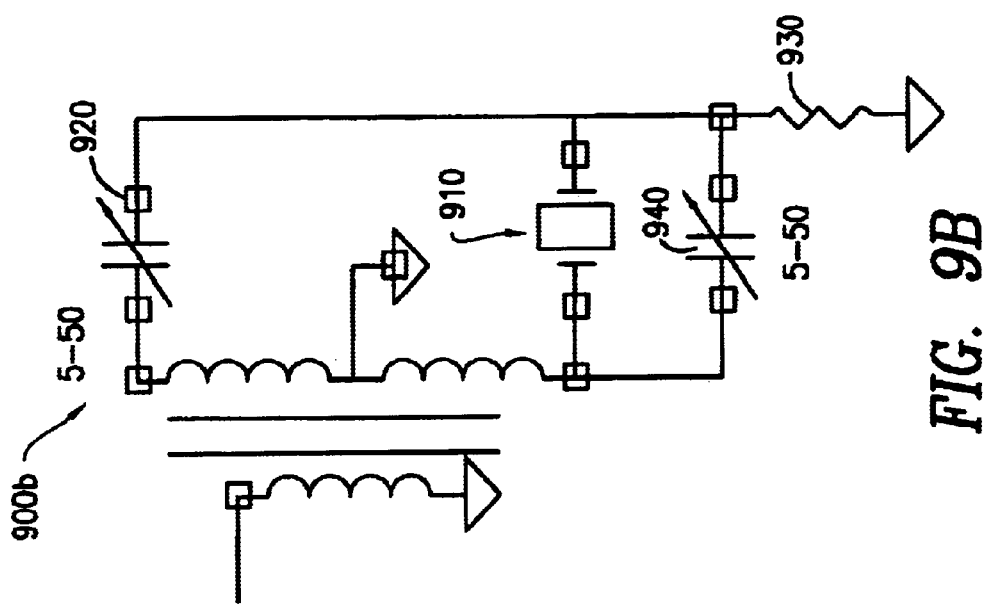
Figure 9A:
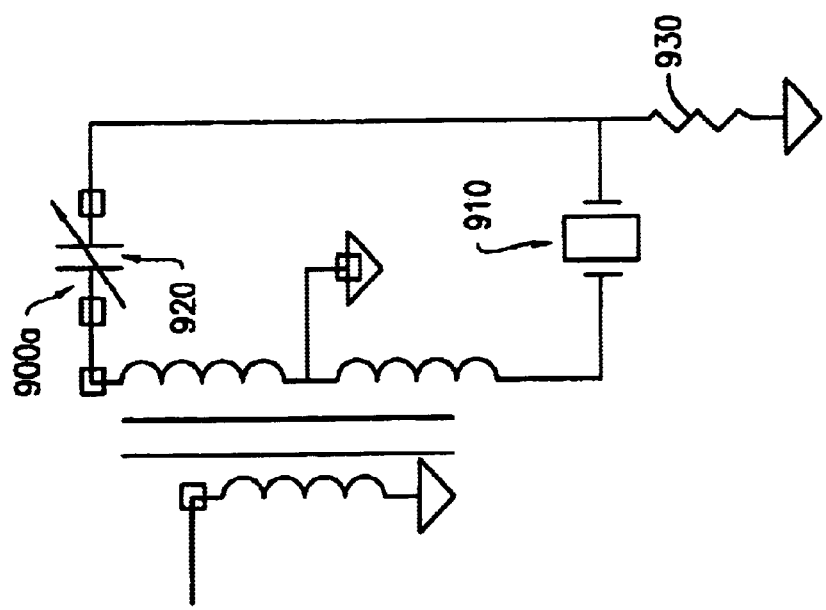
FIG. 9a illustrates a ½ lattice filter suitable for use with the 8/9/10 modulation of FIG. 1 but which otherwise features a typically unacceptable group delay.

The filter 900 shown in FIG. 9(a) is well known to those skilled in the art as a half lattice filter. The crystal 910 operates in the series mode, while a small trimming capacitor $C_t$ 920 is used in a bridge circuit to cancel the crystal holder capacity. When tuned, the value of $C_t$ equals the holder capacity. The crystal frequency must be altered with a series capacitor. The circuit requires a load resistor 930 at the output for best operation. At resonance, the crystal 910 presents a very low resistance value and the signal passes through it. The small trimmer capacity is almost invisible to the signal path.

A novel variation of this bridge circuit is shown as circuit 900b in FIG. 9(b). Therein, additional capacity is deliberately placed across the crystal 910 to cause it to operate in a parallel mode. The resonant frequency of the parallel mode crystal 910 is tuned by means of the parallel shunt capacitor 940, which is usually about 20 pf. In the parallel mode, the impedance is very high, approaching several hundred thousand ohms. The reactance of the negative feedback trimmer is relatively low, being about 50 ohms. At the resonant frequency the crystal 910 becomes invisible and the signal passes via the trimmer capacitor 940. Off resonance, the crystal 910 has a low impedance which causes attenuation of the signal. Preferably, the circuit 910b is as lightly loaded as possible. It can be seen that this circuit obeys the non-Nyquist filter rule. The signal does not pass through the crystal 910, but around it. The crystal 910 is a frequency/impedance reference only. Due to the rapidly reversing phase, the crystal 910 does not have time to ring or build up oscillations, hence it is only partially excited. An unusual characteristic of the parallel mode circuit 900b is that it will not function with the crystal 910 in the parallel overtone mode. The circuit 900b automatically reverts to the series mode with the trimmer canceling the holder and added shunt capacity.

In a typical practical embodiment, the filter has a 3 dB bandwidth of 4 KHz at a 24 MHz IF frequency. The data rate used was 266 Kb/s. The bandwidth efficiency, i.e. bit rate/bandwidth, is 266/4=66.5 bits/sec./Hz. A 4, 5, 6 VMSK/2 code was used, with a nominal Δf of 26.6 kHz. Normally it would not be possible to pass this much deviation in such a narrow bandwidth without considerable distortion and loss of signal. In the present invention this is possible because there is no actual Δf, hence no bandwidth is passed other than the single frequency.

It is the combination of the rapidly reversing phase of the single sideband and the large rise time for the crystal to build up oscillations that enable this filter to function in a low, or almost zero, group delay mode. It will not function in this mode otherwise, for example with FM or PM, where it will remove the Bessel sidebands, which removes all modulation.

Figure 10B:
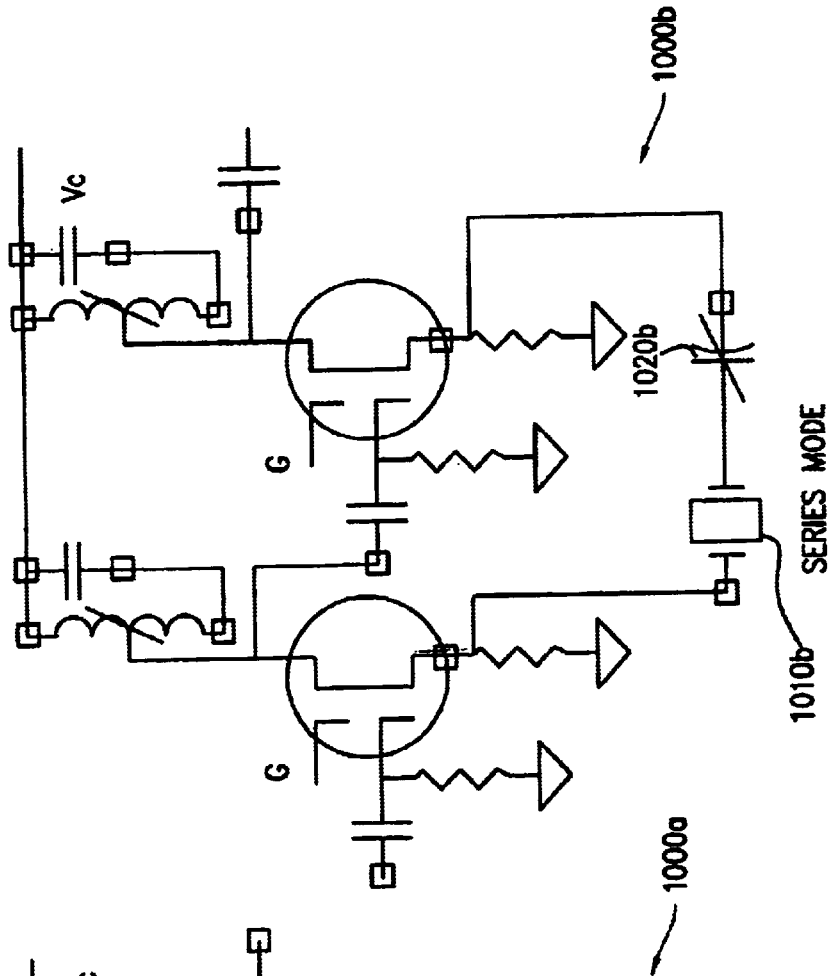
FIGS. 10a, 10b and 10c illustrate low group delay filters suitable for use with the present invention.
Figure 10A:
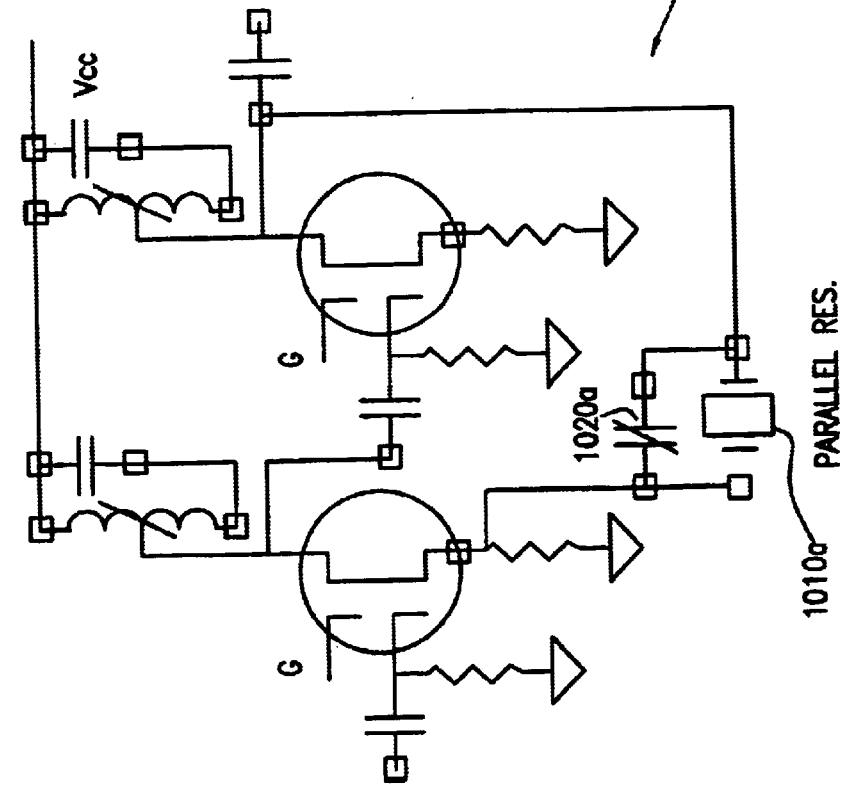

FIG. 10a shows another circuit 1000a which complies with the present invention. The circuit 1000a utilizes an LC tuned filter pair that has a bandwidth, hence a group delay, corresponding to the conventional filter theory. In a practical example the 3 dB bandwidth is equal to or greater than the symbol rate. The feed back circuit with the crystal resonator has a group delay equal to a much narrower bandwidth. In a practical example at 270 kb/s using a 24 MHz filter, the group delay of the LC filter is less than the bit period, the crystal group delay is 30–60 microseconds. In FIG. 10(a), the crystal 1010a is used in a negative feedback circuit to reduce the gain except at the crystal resonant frequency, where the impedance is very high, to the point of being ignored. Since the crystal 1010a does not have time to build up oscillations, the large crystal group delay does not apply, but the narrow bandwidth of the crystal determines the true bandwidth of the overall filter. This circuit is very stable and is one embodiment of the present invention In FIG. 10b, the crystal 1010b is used to provide positive feedback to the amplifier circuit 1000b, making it a Q multiplier circuit with an amplitude response resembling that of the crystal 1010b alone. This circuit 1000b is potentially unstable, becoming a Butler oscillator when the gain is too high. It does result in a very narrow bandpass filter with almost zero group delay if the overall gain of circuit 1000b is less than one.

In both 10(a) and 10(b) the signal path is around the crystal 1010a, 1010b, not through it, thus meeting the conditions necessary for a non-Nyquist filter with very low group delay. Trimmer capacitors 1020a, 1020b are used to set the crystal resonant frequency to exactly that of the sideband frequency to be passed.

Figure 10C:
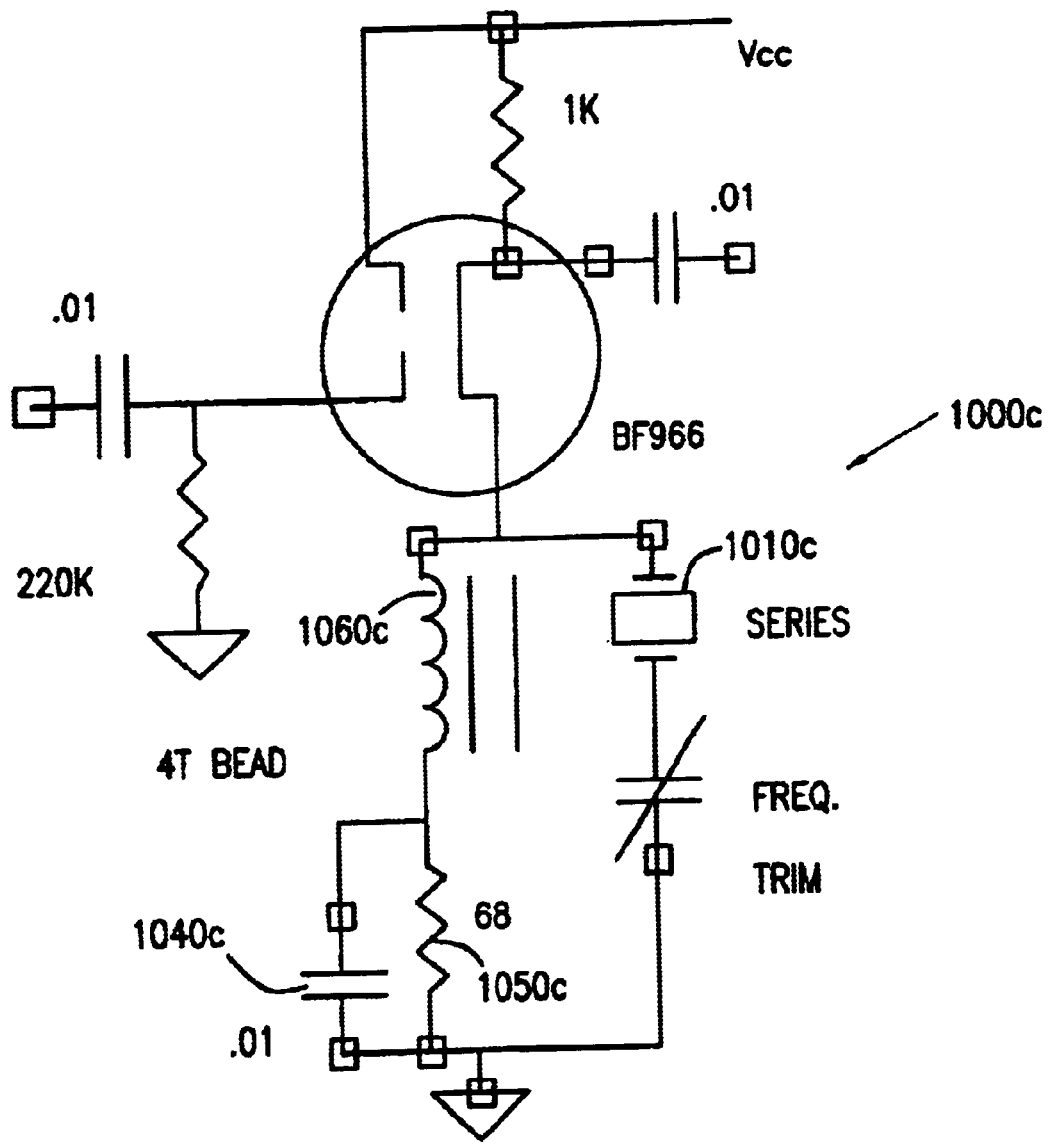

FIG. 10c shows a variation 1000c using a series mode crystal 1010c in which the reference feedback is confined to the source. A series resistor 1050c and inductor 1060c are used to provide a low resistance path to the source for bias purposes, while offering a very high impedance at RF. The crystal 1010c offers a very low resistance across the resistor 1050c and inductor 1060c at the single resonant frequency of the sideband. The gain is maximum at the resonant frequency and lower at any other frequency. The input is phase reversing at a rapid rate, much faster than the very high Q of the crystal 1010c will allow it to respond. The very large group delay of the crystal 1010c forces it to be a reference only for the modulation method of the present invention. The signal path is around the crystal 1010c, not through it, when rapidly varying phase changes are present. Rapidly changing phase tends to negate the group delay of the crystal 1010c or other resonator.

Again, it should be recognized that in all of the above circuits, the signal does not pass through the crystal. The crystal is only a reference that controls the circuit gain relative to frequency. The bandpass is typically 4–8 KHz at the 3 dB points at a 24 MHz resonant frequency. Data rates of up to 900 Kb/s using the present modulation method have been passed through these narrow band filters. The group delay response of FIGS. 10a and 10b (hence the slew rate) is not that of the crystal group delay, but that of the LC circuit. Thus a narrow band response is obtained without a group delay increase. This makes it possible to maintain the advantages of the present modulation method as well as that of VPSK and VMSK/2 referred to above. These modulation methods have no advantage over other methods unless rapid phase changing single sideband transmission and very narrow bandwidth filters are used.

The grass and unwanted harmonics of the modulation pattern are reduced 20–25 dB or more with these filters. This is not a very high degree of sideband rejection, since a 2 pole crystal filter would do much better, but these filter stages can be cascaded to obtain much higher sideband attenuations. LC tuning and or trapping is advisable in addition to the reference crystal to remove spurious modulation harmonic frequencies. Two pole SAW resonators have also been used in these circuits.

Narrow band filters as described greatly reduce the noise bandwidth when used with the present modulation method. A second advantage is obtained from the fact that at the receiver, narrow bandwidth filters are used that pass only a portion of the Nyquist baseband bandwidth. When white noise passes through a narrowband filter, it changes from white Gaussian noise to a near single frequency waveform, approximately that of the center frequency of the filter, with a slow moving envelop in frequency and level. If the sampling rate is greater than this low frequency, only a small portion of the noise appears in each sample. This characteristic, known as the "R" or phase noise reduction effect, greatly improves the detected signal to noise ratio.

Figure 11:
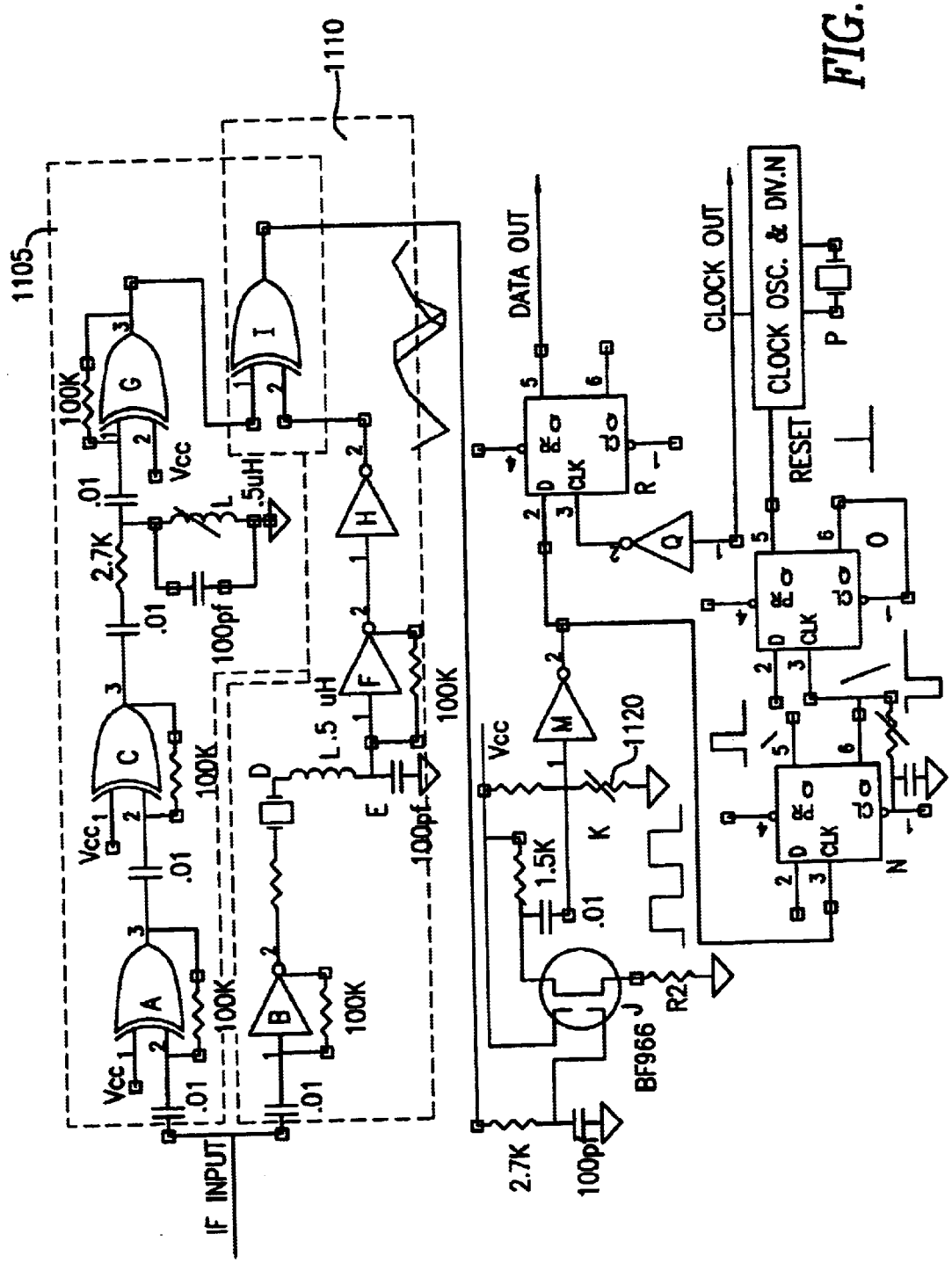
FIG. 11 illustrates a detector suitable for use with the present invention.

Detection:

FIG. 11 shows a preferred implementation of a detector 1100 applicable to the present invention. This detector 1100 has plus/minus outputs, which are then decoded to obtain ones and zeros. It also restores the data clock. The signal from the IF amplifier with a filter having essentially no group delay—at about 0 dBm level after limiting—is passed to the CMOS amplifiers A and B used in an analog mode. As much of the phase deviation as possible is passed through the minimum group delay IF filter. The first two amplifiers raise the signal level to CMOS switching levels. Type 74 AC and 74HC. Integrated Circuits (IC's) can be used in the analog mode.

The upper path 1105, via elements A, C, L, G, and I is a path without group delay, passing the signal $\cos(\omega_c + \omega_m \pm \Delta\theta)t$ without phase distortion. The lower path 1110, via elements B, D, F, H and I is the reference path with $\pm\Delta\theta$ removed by a crystal with large group delay. The paths 1105, 1110 are preferably implemented on separate chips so as to advantageously reduce otherwise possible interference there between. The signal containing $\pm\Delta\theta$ is passed through the series mode crystal D which has a very high Q and therefor a large group delay. This large group delay removes the modulation $\pm\Delta\theta$, leaving a single frequency $\cos(\omega_c + \omega_m)t$ to be used as a reference. This single unmodulated frequency is shifted in phase by the LC phasing network E and passed through amplifiers F and H to the phase detector I. By means of the phasing LCs E and L, the two signals are caused to arrive at the XOR gate phase detector I in phase, plus or minus $\Delta\theta$.

FIG. 12 shows the resulting detected waveform (Q axis reference).

Mathematically: $\cos A \cos B = \frac{1}{2} \cos(A-B) + \frac{1}{2} \cos(A+B)$.

Substituting $A=(\omega_c+\omega_m\pm\Delta\theta)$ and $B=(\omega_c+\omega_m)$, the product is $\cos A \cos B = \frac{1}{2} \cos(2\omega_m) + \cos(\pm\Delta\theta) = \frac{1}{2} \cos(\omega_b) + \cos(\pm\Delta\theta)$ If $\cos(\pm\Delta\theta)$ is removed by long group delay filtering, the remaining $\frac{1}{2} \cos(\omega_b)$ is the desired data clock at the bit rate. $\cos(\pm\Delta\theta)$ appears as early and late crossings of $\frac{1}{2} \cos(\omega_b)$.

Using the I axis, the detected output is $\frac{1}{2} \cos[\omega_b(\tau\pm\Delta\tau)]$. The basic frequency is seen to be that of the clock frequency, but the zero crossings have a time variation equal to the coding. When compared to the clock, only two time variations are seen. These are referred to as early and late relative to the clock.

Referring to FIG. 11, the voltage level detector M has + and − outputs depending on where $\cos(\omega_b)$ is + or − in its time cycle. Assuming negative going transitions are to be used, these occur every 360 degrees $\pm\Delta\theta$, or at the $\omega_b$ rate. The Hex Inverter M inverts and squares the signal to CMOS logic levels and applies them to the D flip flop R, where they are decoded as ones and zeros when properly clocked. The variable resistor K 1120 adjusts the zero crossing level. To obtain a recovered clock, the positive excursions trigger the flip flop N used as a pulse generator, or one shot, whose time "on" is set by the RC values in the Q bar/Clear path. The time delay is adjusted so that the output from Q bar rises midway between the early/late inputs to the D input of flip flop R. For a 7,8,9 code the delay is $\frac{1}{2}$ the coding delay or 1/16 bit period. The early and late crossings occur ±1/16 relative to the clock.

The output of flip flop N drives a very narrow spiking one shot O to create a reset pulse for the clock oscillator and count down divider P. This pulse sets the output of P to a low state. Only the early pulse has any effect. The counter P will already have reset to a low state while free running when a late pulse appears. This method of resetting the clock on early zero crossings causes the clock to track the phase drift and reduce any noise effect. This is equivalent to removing $\cos(\pm\Delta\theta)$, leaving $\cos(\omega_b)$, which is the clock frequency. The clock signal from counter P is inverted by the Hex Inverter Q to clock the ± flip flop R. The CLOCK OUT signal is the clock (un-inverted) sent to the decoder and data destination.

Noise will cause a low frequency phase drift due to the R effect. The sampling rate is much higher than this low drift frequency so that only a small portion of the drift appears in each sample. With a 7, 8, 9 code, this correction can amount to an 8/1 or 9 dB improvement in SNR for a given BER. Again, it should be noted that no carrier is ever needed to recover the data or clock. The present invention increases the number of these early clock resettings and continues these early resettings during long mark space periods. Component values in FIG. 11 are for 266 Kb/s data with a 24 MHz Intermediate Frequency (IF).

Decoding

When used with VMSK/2 modulation, the output is ones and zeros directly without the use of a decoder chip. In the present invention the detector output is + or −, or early/late changes that must be decoded. This is necessary because of the alternations that correct for long strings of ones and zeros.

Figure 13:
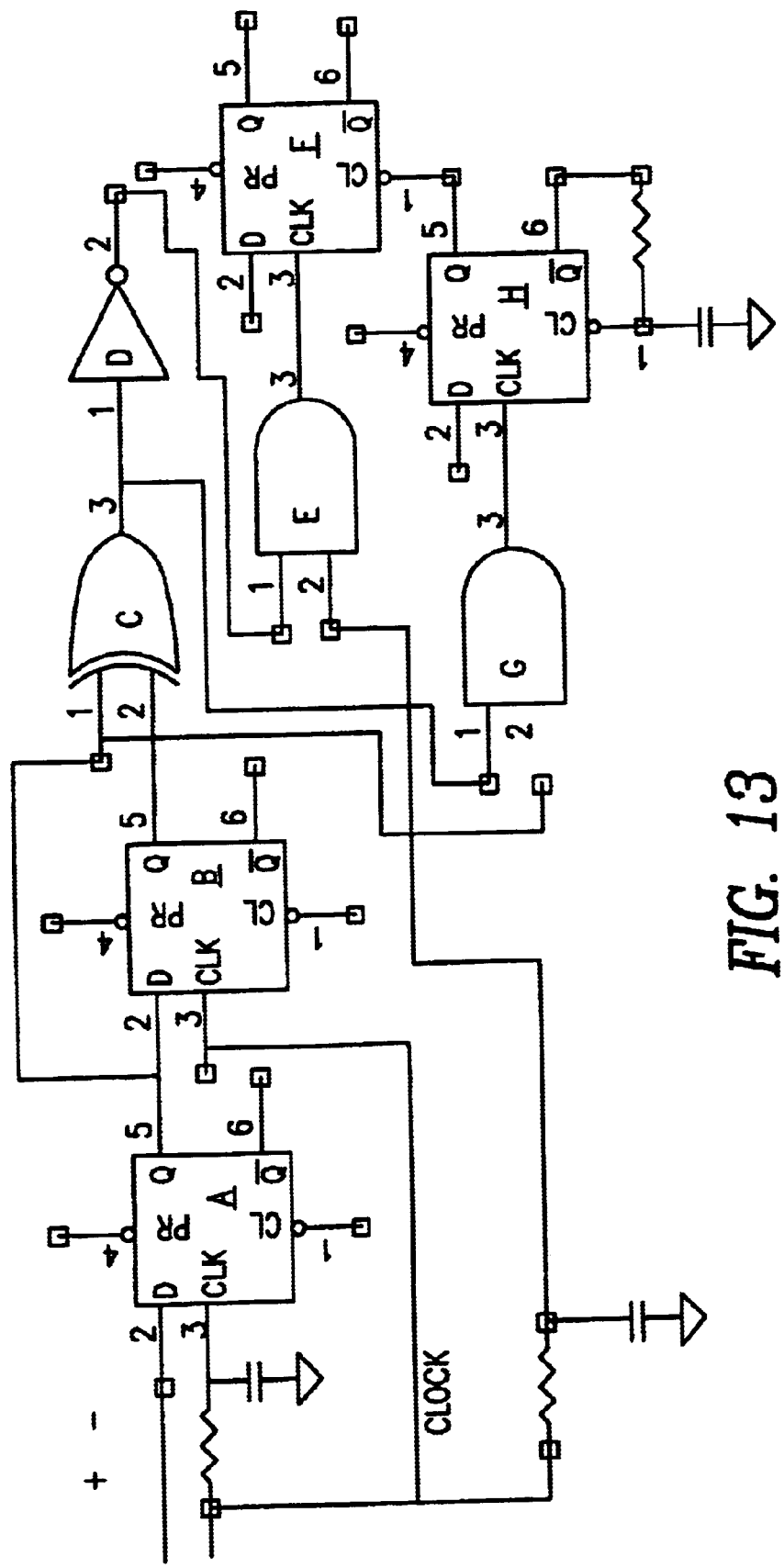
FIG. 13 illustrates a decoder suitable for use with the present invention.

FIG. 13 shows a decoder applicable to the present invention which changes the + or − outputs to ones and zeros according to the encoding algorithm. The + and − outputs of the detector are applied to the D input of a shift register A. A clock signal is input to the clock input of shift register B first to transfer any information already in A. A delayed clock is used at shift register A to load new data after the old data has been transferred to B. An XOR gate C is used to compare the present + or − with the last. If they are the same, the output is low, if they are different the output is high. An inverter D feeds an AND gate E so that when the outputs of A and B match, which according to the present encoding method is a changing 1010101 pattern, clock pulses are fed to the flip flop E causing the output to shift following the 1010101 data. If the A and B outputs are different, there are no clock pulses to F and the last state is held—that is repeat ones or zeros. To prevent ambiguity, the AND gate G causes the flip flop H to change state. This flip flop is a one shot, with a time period set by the RC values in the Q bar to Clear connection. The pulse generated lasts long enough to hold the flip flop E in the clear position until after clock has passed. To set to the clear position, the A and B outputs must be different and the A output must be a one. RC integrators are shown to represent clock delays.

A Cable TV Exemplary Application of the Invention

The unusual spectral nature of the signal encoded using the encoder of the present invention makes possible a new and novel method by means of which digital data channels can be added to the existing TV channels, particularly on cable TV, without increasing the overall cable spectrum used. In this manner the capacity of a cable TV system can be nearly doubled.

These additional digital channels can be used for pay per view TV, Internet downloads, high speed data transfer and distribution, digital audio, or any other use for which digital data modulation can be used.

Figure 14:
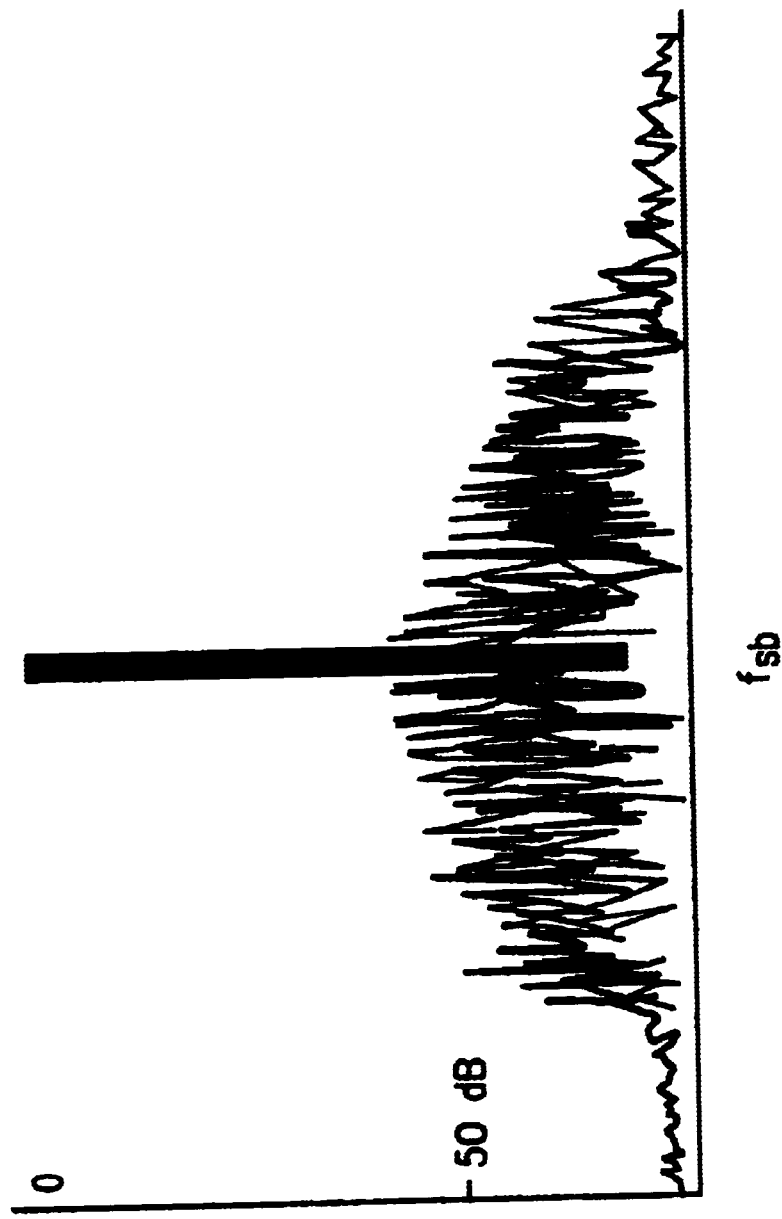
FIG. 14 illustrates an attainable RF sideband $F_{SB}$ according to the present invention.

Cable TV standards require that adjacent channel interference be −45 db below the channel being viewed. The spectrum of the present invention, which is a result of the encoding method prior to modulation and the very minimum phase shift keying modulation, has all skirts at −35 to −45 dB below the sideband peak $f_{sb}$. The spectrum at baseband is shown in FIG. 2 and as an RF signal modulated in accordance with the present invention in FIG. 14. Tests over a cable system have shown that a Very Minimum Phase Shift Keying type of modulation, such as that of the present invention, can be inserted in the region between the aural carrier of a channel and the video carrier of the channel above.

Figure 15:
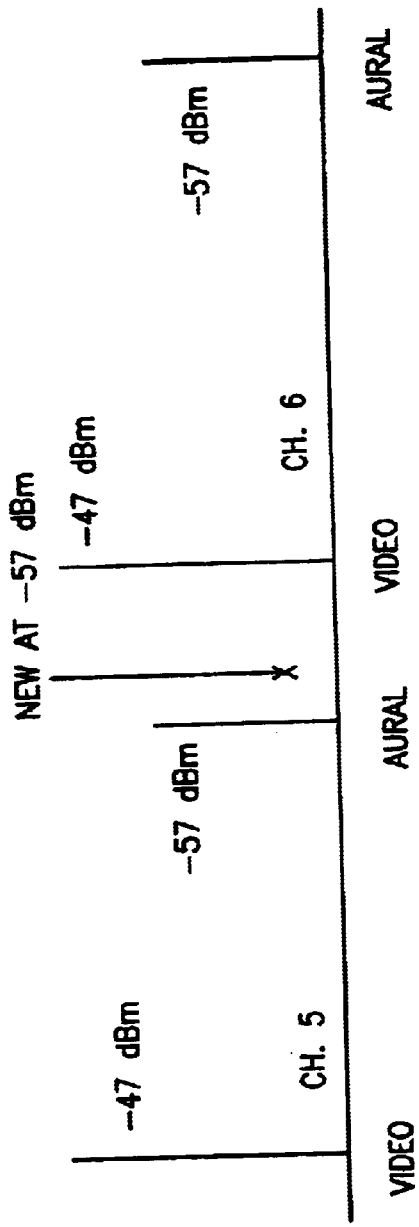
FIG. 15 illustrates an attainable modulation location usable according to the present invention.

FIG. 15 shows the location and signal strengths of the carriers for Channels 5 and 6. Other channels can also be used. The space available for additional channels as seen in FIG. 15 is the region about 50 KHz above the aural carrier of Channel 5 at 81.75 MHz and about 50 KHz into Channel 6 at 82 MHz. That is from from 81.80 to 82.050 MHz, a region that calculates to be 250 KHz wide. A minimum shift keying signal with a nominal bandwidth efficiency greater than 12 b/s/Hz would pass 3.0 Mb/s of data in that bandwidth. With bandwidth efficiencies of 30 b/s/Hz or greater being achieved, even higher data rates can be envisioned.

Tests using the spectrum of the present invention show that the injected signal will not cause interference to either Ch. 5 or Ch. 6 if the inserted sideband signal $f_{sb}$ is at the power level of the aural carrier of Channel 5 and the injected signal is at an orthogonal frequency away from the Ch. 6 video. Orthogonality is well known in the art to enable adjacent channels to have a canceling effect on interference between signals. In TV, orthogonality is used to place the black and white plus the chroma signals on top of one another in the same video frequency space. To be orthogonal, it is required that the new injected signal according to this invention be an odd number times the horizontal frequency divided by 2. For example, 161×15.750/2= 1.253385 KHz has been tried. This is 1.2534−1.25=3.4 KHz below the Ch.6 boundary. This is well within the limits given above, and sufficiently far from either carrier to enable a reasonable filter to be used to remove the aural and video signals from the desired signal at the receiving end.

Figure 16:
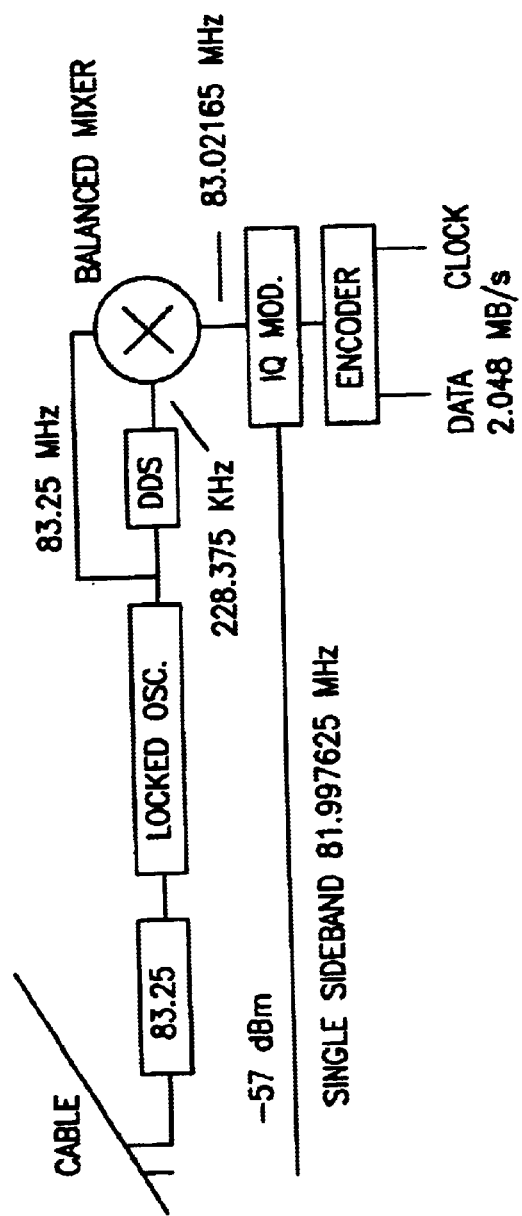
FIG. 16 illustrates a transmitter circuit for creating a quadrature signal suitable for use with for a convention cable television signal according to the present invention.

A signal generating means according to the present invention which meets the cable TV requirements is shown in FIG. 16. A cable TV head end (A) is normally used to receive and add together a number of TV channels so that they may be distributed by the cable (B). The power levels of the individual channels are equalized so that they have a uniform power level at the receiving end. Assuming a 2.048 Mb/s data rate is to be used, the single spectral sideband line will be at 1.024 MHz away from the carrier. To place this sideband in the allowed space and orthogonal to the video carrier above it, the sideband must be 1.024+N(0.00785) MHz away from the video carrier. Choosing the area at the channel edge (82 MHz)—(1.25−1.024)=226 KHz. The closest multiple of 7.875 KHz is 29, and 29×7.875=228.375 KHz.

In FIG. 16, the video carrier is detected through a narrow band filter with large group delay, then used to drive a locked oscillator. The locked oscillator provides a stable frequency at 83.25 MHz, which is used as a clock for a Direct Digital Synthesizer (DOS) chip to generate 228.375 KHz. These two frequencies are mixed to provide a carrier at 83.02165 MHz. This carrier is used by a single sideband generator to obtain a lower single sideband at 81.997625 MHz which is close to the desired 82 MHz.

The injection level to the cable will be at −10 dB relative to the video, so the RMS grass level needs to be at −35 dB relative to SSB signal. This is easily achieved with a 7,8,9 code. The modulated signal is then injected into the cable system via the attenuator (V). A directional coupler with attenuator could also be used. Any encoder which generates a spectral line similar to that described in this disclosure, such as that described in U.S. Pat. No. 5,930,303 referred to above, could also be used. It has been demonstrated that low levels of amplitude modulation can used on top of the present single frequency phase modulation. This amplitude modulation can be used for service messages such as "welcome", "good bye", "please wait" etc. This use of AM over the PM signal is disclosed in U.S. Pat. No. 5,930,303.

This circuit (FIG. 16) describes a new and novel means by which an orthogonal frequency relative to the adjacent channel can be generated, modulated and injected onto the cable system for distribution to subscribers which meets the FCC and Cable TV industry requirements regarding interference, while enabling the transmission of digital data at very high data rates without increasing the overall spectrum used, thus effectively multiplying the cable capacity.

Figure 17:
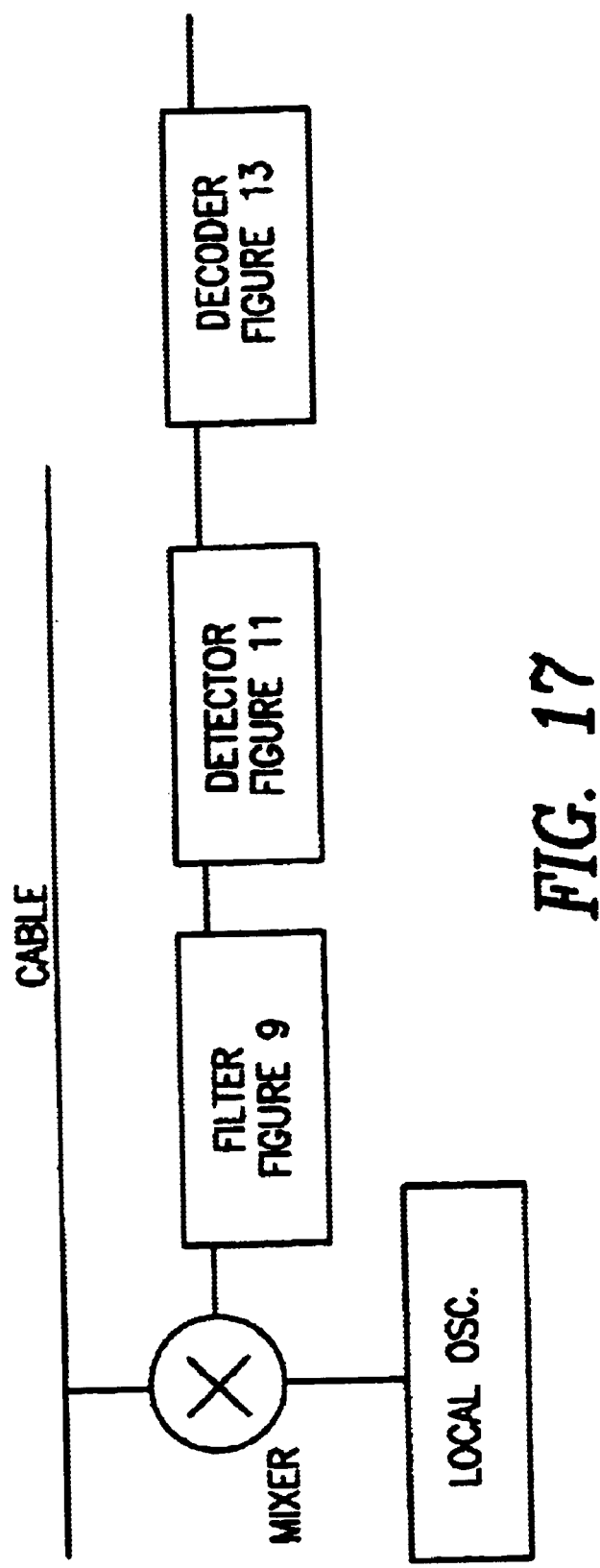
FIG. 17 illustrates a receiver according to the present invention suitable for use with the transmitter of FIG. 16.

FIG. 17 shows a subscriber receiver. The signal from the cable is down converted to an IF frequency to be filtered by the filters of FIGS. 9 and 10, then passed to the detector of FIG. 11 of the present invention. The detected information is then decoded and passed to further circuitry appropriate to the intended use.

Using the Present Invention Over Phone Lines

Figure 18A:
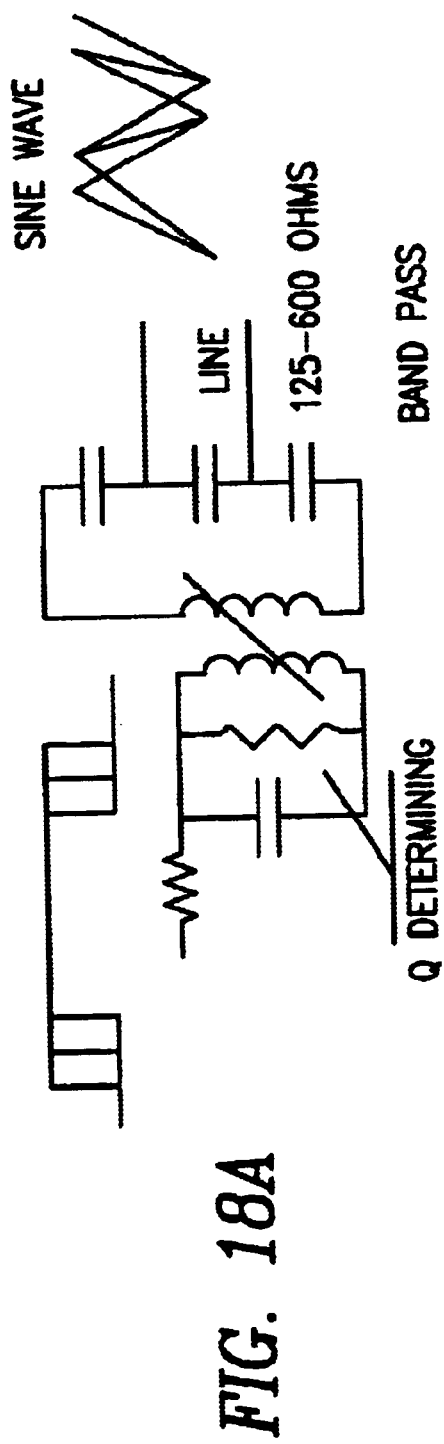
FIG. 18a illustrates a tuned tank circuit which can be used according to the present invention.

The present invention can be used at baseband to transmit signals at high data rates over telephone lines. It is only necessary to use a minimum of filtering on the baseband signals to remove the $3^{rd}$, $5^{th}$ . . . higher harmonics. The simple circuit shown in FIG. 18a as a tuned tank circuit suffices. The Q of the circuit must be about 1.0 to have a sufficiently low group delay. It will be tuned slightly above the single frequency shown in FIG. 2.

Figure 18B:
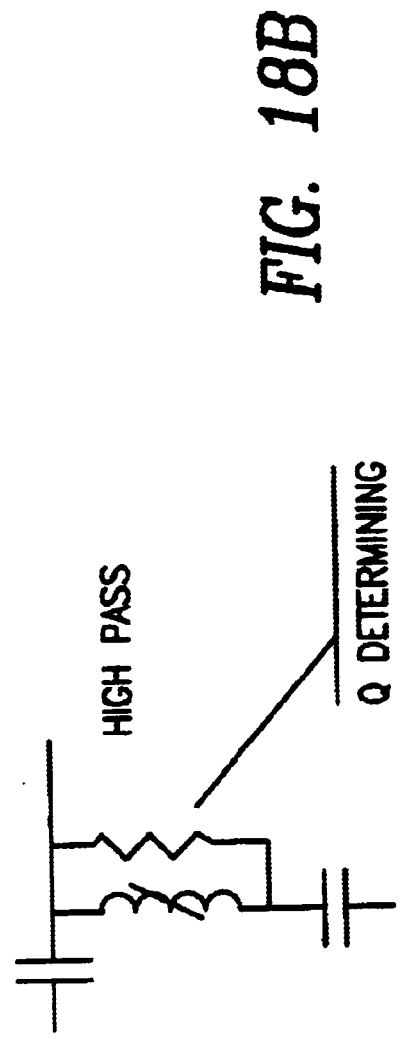
FIG. 18b illustrates a high pass filter which can be used according to the present invention, and, FIG. 19 illustrates a signal amplifier suitable for use with the present invention.
Figure 19:
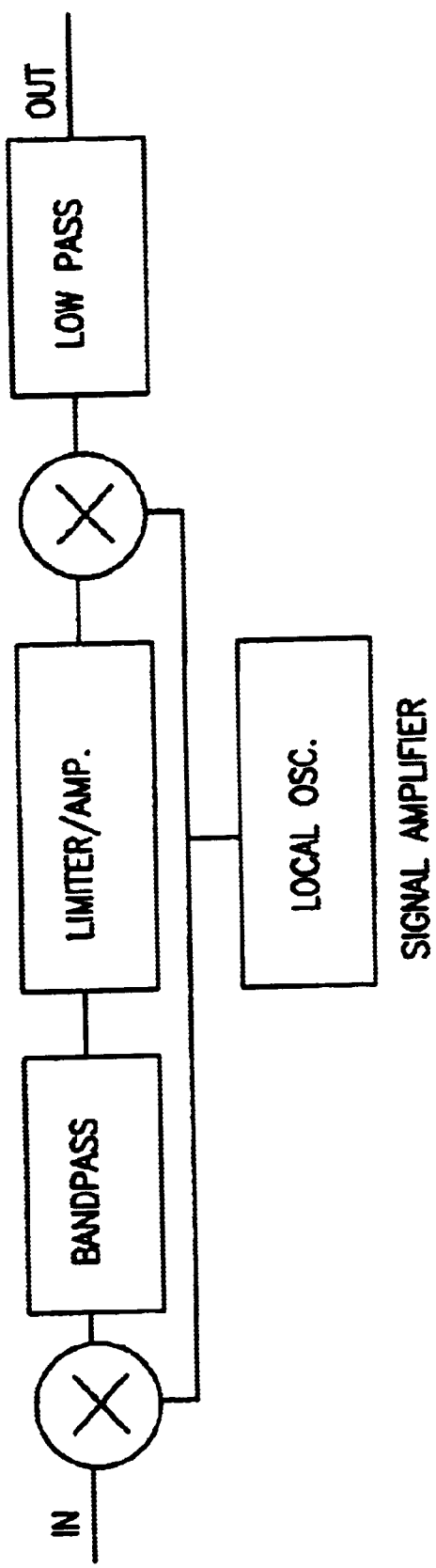

At the receiving end, a high pass filter as shown in FIG. 18b with a Q of 2 can be used to remove low frequency noise and voice components from the line. After the high pass filter, RF modulation and filtering such as in FIG. 19 is used to take advantage of the narrow bandwidth RF filtering usable with this modulation method. There is no known baseband filter that can have the necessary narrow bandpass, hence an RF filter is used. This narrow bandwidth greatly reduces the noise bandwidth, thus enabling a much weaker signal to be detected. Typically, the noise on a phone line is about 80 dBm /Hz. When a broadband method such as CAP, or DMT/OFDM is used, the noise power is multiplied by the bandwidth needed so that the range over a phone line is limited for high data rates. The present invention utilizes a much narrower bandwidth, hence has a better signal to noise ratio at the detector.

Satellite Use:

There are no satellite methods presently available with bandwidth efficiencies better than 3 bits/sec./Hz. This is due, at least in part, to the loss in signal power at higher bandwidth efficiencies. The present method with bandwidth efficiencies obtainable of 60 or better b/s/Hz is an obvious improvement. The other modulation methods are much less power efficient. They require $E_b/N_o$ ratios of 10 dB or more with error correction. The present method can use $E_b/N_o$ values approaching 3 dB. Therefor a much smaller dish can be used. Lower power levels can be used which enables the satellite operator to adjust the overall load in the transponder for less distortion.

The very narrow bandwidth required means that many more user channels can be added per transponder. The present method is very tolerant of frequency and phase shift, since the 'R' effect tracking absorbs them. Hence Doppler effects and transponder offsets are of little importance.

Cellular Telephone Use:

Present AMPS telephone channels are 40 KHz wide. They are able to carry digital data at 19.2 Kb/s maximum. This is the practice for CDPD use. Using the present invention, the same channel can carry 750 Kb/s of digital data and still comply with FCC regulations. i.e. Tech. Standards, thus video conferencing and high speed data downloads for Internet can be carried on the presently obsolete AMPS channels. Using the present FM method, the $E_b/N_o$ for 10-6 BER required is 13 dB. Using the method of the present invention, the $E_b/N_o$ required is less than 5 dB. This is an 8 dB improvement in $E_b/N_o$, which results in more than doubling the range, or, operation is improved under difficult conditions e.g. blind spots. The better the $E_b/N_o$, the closer Cell sites can be spaced, therefore more users can be accommodated.

It is obvious that other logic devices and similar circuits could be used to achieve the results of the present invention without changing the nature of, or detracting from the essential performance features of, the present invention. While the foregoing invention has been described with reference to the above embodiments, various modifications and changes can be made without departing from the spirit and scope of the invention as hereinafter claimed. It is intended that the patent shall cover by suitable expression in the appended claims, whatever features of patentable novelty exist in the invention disclosed.

I claim:

1. A method of modulating a phase reversing pulse train including a plurality of signal pulses each having an associated period of a given temporal duration to encode a multiplicity of input data bits each having a data state, and prevent losses of clock timing, said method comprising the steps of:

identifying select ones of said input data bits which repeat the data state of a respectively preceding one of said input data bits;

identifying select ones of said pulses which correspond to said select bits; and, alternately shortening and lengthening said periods associated with said select ones of said pulses.

2. The method of claim 1, further comprising: dividing said associated period for each of said pulses into a plurality of temporal apertures.

3. The method of claim 2, wherein said alternately shortening and lengthening said period comprises:

selecting a first and a second number of said apertures;

reversing a phase associated with each select pulse after said first number of apertures in a first mode; and, reversing said phase associated with each select pulse after said second number of apertures in a second mode.

4. The method of claim 1, wherein said alternately shortening and lengthening said period further comprises, alternating between said first and second modes each time it a select bit is identified.

5. The method of claim 4, further comprising:

selecting a third number of said plurality of apertures;

reversing said phase of each other of said pulses after said third number of apertures in a third mode.

6. The method of claim 5, wherein each said preceding bit immediately precedes one of said select bits, respectively.

7. The method of claim 5, wherein:

said third number is greater than said first number; and, said second number is greater than said third number.

8. The method of claim 7, wherein said third number of apertures corresponds to said associated temporal duration.

9. The method of claim 1, wherein positive and negative excursions for each of said pulses are one bit width wide, plus or minus a small fraction of said bit width so as to keep the bit widths continuously changing plus or minus by equal amounts during long periods of transmitted marks or spaces.

10. The method of claim 1, wherein a start of a string of ones or zeros as said input bits is indicated by a shortened or lengthened pulse width, followed immediately by a width change in an opposite direction.

11. The method of claim 1, wherein a frequency spectrum resulting from said modulation is a substantially single frequency line at ½ the bit rate without visible frequency or phase modulation, but which is detectable from bipolar phase reversals.

12. The method of claim 11, further comprising: doubling the single frequency spectral line to yield a data clock signal.

13. The method of claim 1, further comprising introducing strings of ones or zeros to reset the clock repeatedly on only one time boundary edge, to prevent a shift in clock timing.

14. The method of claim 1, further comprising: filtering off Fourier products without loss of phase change magnitude.

15. The method of claim 1, further comprising single sideband suppressed carrier modulating a carrier signal to produce a single spectral frequency alternating in phase at a desired frequency.

16. The method of claim 15, wherein the encoded single sideband frequency is added to analog TV signals on a cable distribution system to add digital channels between analog channels without substantially interfering with the analog channels.

17. A modulator for modulating a bipolar signal including a plurality of signal pulses each having an associated period of a given temporal duration to encode a multiplicity of input data bits each having a data state, and prevent losses of clock timing, said modulator comprising:

means for identifying select ones of said input data bits which repeat the data state of a respectively preceding one of said input data bits;

means for identifying select ones of said pulses which correspond to said select bits; and, means for shortening and lengthening said periods associated with said select ones of said pulses.

18. A filter suitable for use in modulating a phase reversing pulse train including a plurality of signal pulses each having an associated period of a given temporal duration to encode a multiplicity of input data bits each having a data state, and prevent losses of clock timing, said filter comprising:

a transformer including first and second secondary nodes;

a first capacitor coupled to said first node;

a crystal oscillator coupled to said second node; and, a second capacitor coupled to said second node;

wherein, when the crystal oscillator is excited by a narrow band rapidly phase reversing signal frequency acts as a reference element only.

19. A filter suitable for use in modulating a phase reversing pulse train including a plurality of signal pulses each having an associated period of a given temporal duration to encode a multiplicity of input data bits each having a data state, and prevent losses of clock timing, said filter comprising:

a reference resonator having a group delay; and, a signal path that bypasses the resonator, such that the group delay of the resonator does not factor in transmission of said modulated pulses, but determines a bandwidth of the filter by virtue of said resonator being used as an impedance reference only.

20. The filter of claim 19, wherein the reference resonator is operated in a parallel mode, has a high impedance at a frequency associated with said temporal duration such that said pulses do not pass through it, and provides negative feedback at frequencies off resonance.

21. The filter of claim 19, wherein said reference resonator is operated in a series mode, provides positive feedback that accentuates the gain of the filter at a resonant frequency, and is not in a signal of said modulated pulses.

22. The filter of claim 19, wherein the reference resonator is independent of a group delay of the filter.

23. A method of digital data encoding a multiplicity of data bits, each having a data state, to cause a phase or polarity reversal each bit period while changing the temporal duration of each bit period to encode the data, the said method comprising the steps of:

identifying the data state of the last incoming bit;

alternately shortening and lengthening duration of the phase reversal period if the bit is repeated;

reversing phase or polarity at exactly one bit period if the data state changes from a one to a zero or vice versa.

24. The method of claim 23 in which a series of phase or polarity reversals of duration equal to one bit period represents an alternating one/zero pattern.

25. The method of claim 23 in which a repeated digital one is represented by a shortened phase reversal period.

26. The method of claim 23 in which a repeated digital zero is represented by a shortened phase reversal period.

27. The method of claim 25 in which additional repeated bits of the same polarity are represented by alternately shortening and lengthening the phase reversal times relative to a normal bit period.

28. The method of claim 23 in which a phase or polarity reversal equal to one bit period represents a change from a one to a zero and vice versa.

29. A filter suitable for use in modulating a phase reversing pulse train including a plurality of signal pulses each having an associated period of a given temporal duration to encode a multiplicity of input data bits each having a data state, and prevent losses of clock timing, said filter comprising:

a reference resonator having a group delay independent of a group delay of the filter operated in a parallel mode having a high impedance at a frequency associated with said temporal duration such that said pulses do not pass through it, and provides negative feedback at frequencies off resonance; and, a signal path that bypasses the resonator, such that the group delay of the resonator does not factor in transmission of said modulated pulses, but determines a bandwidth of the filter by virtue of said resonator being used as an impedance reference only.

30. A filter suitable for use in modulating a phase reversing pulse train including a plurality of signal pulses each having an associated period of a given temporal duration to encode a multiplicity of input data bits each having a data state, and prevent losses of clock timing, said filter comprising:

a reference resonator having a group delay having a group delay independent of a group delay of the filter operated in a series mode, providing positive feedback that accentuates the gain of the filter at a resonant frequency, and is not in a signal of said modulated pulses; and a signal path that bypasses the resonator, such that the group delay of the resonator does not factor in transmission of said modulated pulses, but determines a bandwidth of the filter by virtue of said resonator being used as an impedance reference only.

31. A digital communication system comprising:

a means for modulating a pulse train wherein a Fourier frequency components bearing abrupt changes of phase, each of said Fourier frequency components being a single frequency; and a filtering means operable to pass a selected one of said Fourier frequency components.

32. The system as recited in claim 31, wherein said filter means is a resonator operated as a parallel shunt-tuned reference, having a high infinite impedance at a selected one of said Fourier frequency components wherein said reference is transparent to said selected Fourier frequency component.

33. The system as recited in claim 32, wherein said selected Fourier frequency component does not exhibit a group delay associated with said resonator.

34. The system as recited in claim 33, wherein said abrupt changes of phase associated with said selected Fourier frequency component pass said filter means without incurring loss of phase change.

* * * * *